US012592123B2

(12) United States Patent
Petersen et al.

(10) Patent No.: US 12,592,123 B2
(45) Date of Patent: Mar. 31, 2026

(54) ACCESSING GAMING ESTABLISHMENT ACCOUNT FUNDS WITH A TICKET VOUCHER BASED ON MULTIPLE CASHOUT INPUTS

(71) Applicant: IGT, Las Vegas, NV (US)

(72) Inventors: Erik Petersen, Sparks, NV (US);
Jeffery Shepherd, Reno, NV (US);
Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 336 days.

(21) Appl. No.: 18/321,582

(22) Filed: May 22, 2023

(65) Prior Publication Data

US 2024/0395108 A1 Nov. 28, 2024

(51) Int. Cl.

| | |
|---|---|
| *A63F 9/24* | (2006.01) |
| *A63F 11/00* | (2006.01) |
| *G06F 13/00* | (2006.01) |
| *G06F 17/00* | (2019.01) |
| *G06Q 20/04* | (2012.01) |
| *G06Q 20/24* | (2012.01) |
| *G06Q 50/34* | (2012.01) |
| *G07F 17/32* | (2006.01) |

(52) U.S. Cl.
CPC ..... *G07F 17/3244* (2013.01); *G06Q 20/0457* (2013.01); *G06Q 20/24* (2013.01); *G06Q 50/34* (2013.01); *G07F 17/3241* (2013.01)

(58) Field of Classification Search
CPC ... G07F 17/32; G07F 17/3214; G07F 17/3222

USPC .............................. 463/1, 20, 22, 25, 29, 30
See application file for complete search history.

(56) References Cited

U.S. PATENT DOCUMENTS

| | | | |
|---|---|---|---|
| 8,221,223 B2 | 7/2012 | Walker et al. | |
| 8,721,449 B2 | 5/2014 | Johnson et al. | |
| 9,123,203 B2 | 9/2015 | Johnson | |
| 9,530,277 B2 | 12/2016 | Nelson et al. | |
| 9,564,004 B2 | 2/2017 | Johnson | |
| 9,613,491 B2 | 4/2017 | Roth | |
| 9,633,508 B2 | 4/2017 | Johnson | |
| 9,652,934 B2 | 5/2017 | Johnson et al. | |
| 9,916,735 B2 | 3/2018 | Chun | |
| 10,991,205 B2 | 4/2021 | Mchugh et al. | |
| 11,132,862 B2 | 9/2021 | Cleveland et al. | |
| 11,321,994 B2 * | 5/2022 | Prabhaker | G06Q 50/34 |
| 11,393,289 B2 | 7/2022 | Johnson | |
| 11,455,859 B2 | 9/2022 | Cleveland | |
| 11,551,523 B2 | 1/2023 | Vasquez et al. | |
| 11,640,745 B2 | 5/2023 | Johnson | |
| 2006/0287063 A1 | 12/2006 | Walker et al. | |
| 2009/0104954 A1 | 4/2009 | Weber et al. | |
| 2009/0233705 A1 | 9/2009 | Lemay et al. | |
| 2015/0279152 A1 | 10/2015 | Johnson et al. | |
| 2015/0287282 A1 | 10/2015 | Johnson et al. | |
| 2019/0272704 A1 | 9/2019 | Lemay et al. | |
| 2020/0035065 A1 | 1/2020 | Ellis et al. | |

(Continued)

*Primary Examiner* — Adetokunbo O Torimiro

(74) *Attorney, Agent, or Firm* — Neal, Gerber & Eisenberg LLP

(57) ABSTRACT

Systems and methods that employ a ticket voucher to access funds maintained in a gaming establishment account based on multiple cashout inputs received and bypassing an automatic transfer of an amount of funds to the gaming establishment account.

20 Claims, 22 Drawing Sheets

(56)  References Cited

U.S. PATENT DOCUMENTS

| 2022/0262203 | A1 |  | 8/2022 | et al. |  |
| 2023/0114727 | A1 | * | 4/2023 | Ellis ....................... | G06Q 40/03 |
|  |  |  |  |  | 463/25 |

* cited by examiner

Lucky's Casino
Issue Ticket from Account

Ticket Voucher
Issuance
from Account
Complete!

Account
Home

Credit Meter: 0
Credits

B

The Service Window on the EGM/SMIB opens and asks the player if they'd like a cashout voucher Lucky's Casino
Issue Ticket from Account Would you like to get a cashout voucher?

Please make your choice in 10s

Yes

Cancel

Credit Meter: 1000 Credits

Player Presses the Cashout Button on the EGM

CASH OUT

The Service Window on the EGM/SMIB opens and asks the player if they'd like a cashout voucher Lucky's Casino
Issue Ticket from Account Would you like to get a cashout voucher?

Please make your choice in 10s

Yes

Cancel

Credit Meter: 1000 Credits

Player Presses the Cashout Button on the EGM

CASH OUT

A

Lucky's Casino
Issue Ticket from Account

Ticket Voucher
Issuance from
Account
Complete!

Account
Home

Credit Meter: 0
Credits

ACCESSING GAMING ESTABLISHMENT ACCOUNT FUNDS WITH A TICKET VOUCHER BASED ON MULTIPLE CASHOUT INPUTS

CROSS-REFERENCE TO RELATED APPLICATIONS

This application is related to the following commonly owned co-pending patent applications: U.S. application Ser. No. 18/321,554, entitled "ACCESSING GAMING ESTAB-LISHMENT ACCOUNT FUNDS WITH A TICKET VOUCHER," and U.S. application Ser. No. 18/321,567, entitled "ACCESSING GAMING ESTABLISHMENT ACCOUNT FUNDS CONVERTED TO A TICKET VOUCHER AS PART OF CASHOUT TRANSACTION."

BACKGROUND

In various embodiments, the systems and methods of the present disclosure employ a ticket voucher to access funds maintained in a gaming establishment account based on multiple cashout inputs received and bypassing an automatic transfer of an amount of funds to the gaming establishment account.

Casinos are associated with multiple different channels of commerce including gaming activities (e.g., wagers on plays of games at electronic gaming machines and gaming tables) and non-gaming activities (e.g., making retail purchases at point-of-sale terminals throughout the casino).

BRIEF SUMMARY

In certain embodiments, the present disclosure relates to a system including a processor, and a memory device that stores a plurality of instructions. When executed by the processor responsive to a first cashout input being received by an input device of an electronic gaming machine that causes an automatic transfer of a first amount of funds of a credit meter of the electronic gaming machine to a gaming establishment account associated with a user, the instructions cause the processor to communicate data that results in a display of a second amount of funds available. When executed by the processor responsive to an input to obtain a ticket voucher associated with a third amount of funds and a transfer of the third amount of funds from the gaming establishment account associated with the user to the credit meter of the electronic gaming machine, the instructions cause the processor to cause a first modification of the electronic gaming machine to disable an automatic transfer on cashout feature of the electronic gaming machine. When executed by the processor following the electronic gaming machine issuing the ticket voucher associated with the third amount of funds responsive to a second cashout input being received by the input device of the electronic gaming machine when the automatic transfer on cashout feature of the electronic gaming machine is disabled, the instructions cause the processor to cause a second modification of the electronic gaming machine to enable the automatic transfer on cashout feature of the electronic gaming machine.

In certain embodiments, the present disclosure relates to a system including a processor, and a memory device that stores a plurality of instructions. When executed by the processor responsive to a first cashout input received by an input device of an electronic gaming machine, the instruc- tions cause the processor to cause an automatic transfer of a first amount of funds of a credit meter of an electronic gaming machine to a gaming establishment account associ- ated with a user. When executed by the processor responsive to an input to obtain a ticket voucher associated with a second amount of funds being received, the instructions cause the processor to cause the second amount of funds to be transferred from the gaming establishment account asso- ciated with the user to the credit meter of the electronic gaming machine. When executed by the processor respon- sive to a second cashout input received by the input device of the electronic gaming machine, the instructions cause the processor to bypass any automatic transfer of the second amount of funds transferred to the credit meter of the electronic gaming machine back to the gaming establish- ment account associated with the user and cause an issuance of the ticket voucher associated with the second amount of funds.

In certain embodiments, the present disclosure relates to a method of operating a system. Responsive to a first cashout input being received by an input device of an electronic gaming machine that causes an automatic transfer of a first amount of funds of a credit meter of the electronic gaming machine to a gaming establishment account associated with a user, the method includes causing a display, by a display device, of a second amount of funds available. Responsive to an input to obtain a ticket voucher associated with a third amount of funds and a transfer of the third amount of funds from the gaming establishment account associated with the user to the credit meter of the electronic gaming machine, the method includes causing, by a processor, a first modi- fication of the electronic gaming machine to disable an automatic transfer on cashout feature of the electronic gaming machine. Following the electronic gaming machine issuing the ticket voucher associated with the third amount of funds responsive to a second cashout input being received by the input device of the electronic gaming machine when the automatic transfer on cashout feature of the electronic gaming machine is disabled, the method includes causing, by the processor, a second modification of the electronic gaming machine to enable the automatic transfer on cashout feature of the electronic gaming machine.

Additional features are described herein, and will be apparent from the following Detailed Description and the figures.

DETAILED DESCRIPTION

Figure 1:
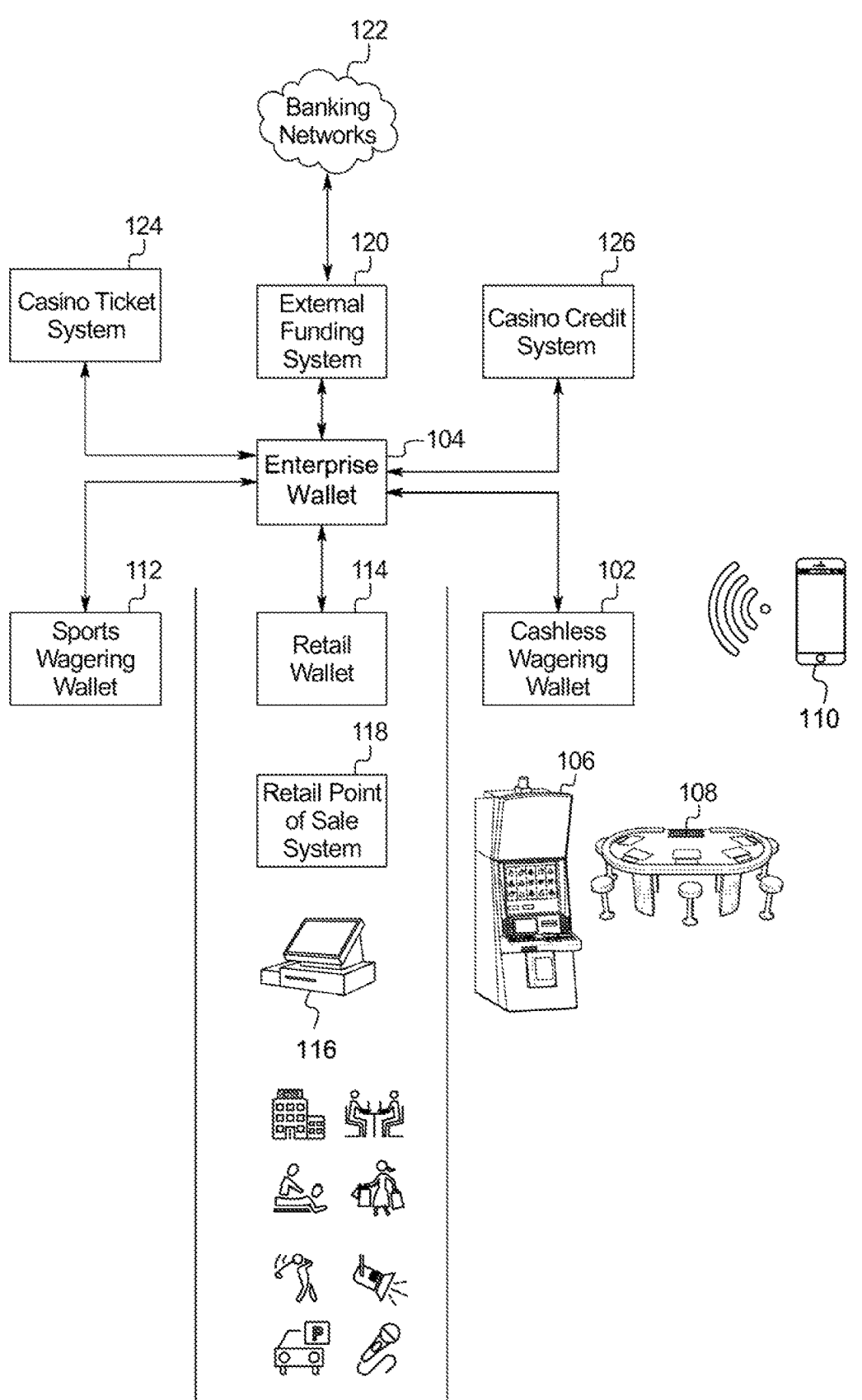
FIG. 1 is an example configuration of the architecture of a plurality of different components of the system of the present disclosure.

In various embodiments, the systems and methods of the present disclosure employ a ticket voucher to access funds maintained in a gaming establishment account based on multiple cashout inputs received and bypassing an automatic transfer of an amount of funds to the gaming establishment account.

In certain embodiments, to enable a user to access funds in a gaming establishment account, such as a cashless wagering account, the system of the present disclosure utilizes a procurement of a ticket voucher (e.g., an anonymous bearer instrument associated with an amount of funds and redeemable for cash via a kiosk or a cashier and/or redeemable for game play on a gaming establishment device, such as an electronic gaming machine). That is, rather than a user having to travel to a gaming establishment service desk and engage with gaming establishment personnel to withdraw funds held in a gaming establishment account (which requires time and effort of all parties involved and fosters the spread of diseases in such interactions), in certain embodiments, the system enables a user to obtain a ticket voucher associated with such funds and without having to interact with any gaming establishment personnel. In these embodiments, the system enables a user to make one or more inputs, such as via an electronic gaming machine ("EGM"), an externally controlled interface displayed by the EGM and/or a mobile device application executed on a mobile device, that result in a potential occurrence of a ticket voucher acquisition event. In certain embodiments, in association with an occurrence of the ticket voucher acquisition event, the system causes a transfer of an amount of funds from a gaming establishment account maintained for a user to a credit meter of an EGM and then such funds are cashed out to a ticket voucher or otherwise converted to a ticket voucher associated with a component of a gaming establishment ticket management system. In certain other embodiments, in association with an occurrence of the ticket voucher acquisition event, the system causes a conversion of an amount of funds transferred from a gaming establishment account maintained for a user to a ticket voucher associated with a component of a gaming establishment ticket management system.

In certain embodiments, the inputs made by the user in association with the initiation of a potential occurrence of the ticket voucher acquisition event at least partially determine one or more subsequent actions undertaken to possibly procure a ticket voucher associated with an amount of funds withdrawn from a gaming establishment account maintained for that user. In these embodiments, since, in certain instances, responsive to a cashout input received at the EGM, funds from a credit meter of the EGM being played by an identified user having a gaming establishment account are automatically transferred from the credit meter of the EGM to that gaming establishment account, the system utilizes one or more inputs made by the user to potentially temporarily disable such an automatic transfer on cashout feature and further to enable the user to transfer additional funds from the gaming establishment account to be converted to a ticket voucher. As such, the triggering action undertaken by the user that begins the flow of a user potentially obtaining a ticket voucher for an amount of funds in gaming establishment account (and/or funds held by an EGM in an active session) enables the system to determine the user's intent to procure a ticket voucher and any modifications of the operation of the EGM.

In different instances, via the user performing an interaction with a user interface associated with the EGM and/or a component of a gaming establishment management system, such as a slot machine interface board ("SMIB") and/or via the user engaging a cashout device of the EGM and then performing an interaction with a user interface associated with the EGM and/or a component of a gaming establishment management system, such as a SMIB, the system proceeds differently to make an amount of funds available to be converted to a ticket voucher. In certain such embodiments, responsive to one or more inputs received, one or more components of the system effectively bypass the credit meter of the EGM and cause an EGM to issue a ticket voucher associated with an amount of funds withdrawn from a gaming establishment account. In certain other embodiments, responsive to one or more inputs received, one or more components of the system cause a transfer of an amount of funds from a gaming establishment account to a credit meter of an EGM to be cashed out by the user for a ticket voucher. In these other embodiments, one or more components of the system disable (or enable) certain automatic transfer on cashout features that would prohibit the EGM from issuing the ticket voucher associated with the amount of funds withdrawn from the gaming establishment account.

Accordingly, such a system that supports the movement of funds from a gaming establishment account, such as a cashless wagering account, to a ticket voucher issued by an EGM overcomes certain security concerns (e.g., users and/or gaming establishment personnel carrying large sums of cash) associated with cash-based gaming and provides for a relatively more efficient experience for users by reducing the quantity of touchpoints a user interacts with to obtain funds held in a gaming establishment account. In addition to providing a relatively safer environment via the reduction of uses of cash, the system of the present disclosure reduces face-to-face interactions between users and gaming establishment personnel, thereby reducing risks associated with the spread of diseases between such parties.

In various embodiments, the present disclosure is directed to a gaming establishment fund management system including various sub-systems that are each associated with or otherwise maintain one or more electronic or virtual accounts. In these embodiments, the various accounts maintained for a user individually or collectively form a resort or enterprise account (i.e., a gaming establishment fund management account) for the user. That is, the collection of cashless wagering accounts (e.g. cashless gaming establishment wagering wallets, cashless sports wagering wallets and/or cashless mobile wagering wallets) and gaming establishment retail accounts (e.g., gaming establishment retail wallets) associated with or otherwise maintained for a user, such as a retail patron, individually or collectively form a resort or enterprise account (i.e., an integrated resort or gaming establishment fund management wallet) that the user may access to transfer funds and/or view balance information amongst the various accounts associated with or otherwise maintained for the user.

In various embodiments, the gaming establishment fund management system includes or is otherwise associated with one or more cashless wagering systems. Each cashless wagering system is associated with or otherwise maintain one or more cashless wagering accounts. In different embodiments, funds held in zero, one or more of these cashless wagering accounts are accessible in association with (or otherwise configured to be accessible upon one or more inputs from a user and/or gaming establishment personnel) a potential procurement of a ticket voucher.

In certain embodiments, the gaming establishment fund management system includes a first cashless wagering system that maintains a first cashless wagering account. In these embodiments, a user, such as a player of an EGM, utilizes a mobile device application running on a mobile device and/or a physical instrument (e.g., a smart card or a user issued magnetic striped card which the user utilizes via inserting the card into a card reader associated with the EGM) to facilitate the electronic transfer of any funds between this first cashless wagering account and a gaming device, such as a component of a gaming table and/or an EGM (including, but not limited to, a slot machine, a video poker machine, a video lottery terminal, a terminal associated with an electronic table game, a terminal associated with a live table game, a video keno machine, a video bingo, and/or a sports betting terminal (that offers wagering games and/or sports betting opportunities)). For example, as seen in FIG. 1, the gaming establishment fund management system includes a first cashless wagering system (not shown) that maintains a Cashless Wagering Wallet 102 (e.g., a first cashless wagering account) which is in communication with an enterprise wallet 104. In this example, to facilitate the transfer of funds between this cashless wagering account and a credit meter of an EGM 106 and/or a credit meter of a gaming table component (not shown) associated with a gaming table 108, the system utilizes a mobile device 110 running a mobile device application that interfaces with one or more components of the gaming establishment fund management system to enable a user, such as a player of the EGM or a player at the gaming table, access to this first cashless wagering account.

In certain embodiments, the gaming establishment fund management system additionally or alternatively includes or is otherwise associated with a second cashless wagering system that maintains a second cashless wagering account. In these embodiments, funds associated with the second cashless wagering account are utilized to place one or more sporting event wagers and/or wagers placed remote from an EGM and a gaming table. In such embodiments, a user utilizes a mobile device application running on a mobile device and/or a physical instrument (e.g., a smart card or a user issued magnetic striped card which the user utilizes via inserting the card into a kiosk) to facilitate the electronic transfer of any funds between this second cashless wagering account and a credit meter accessible to wager on sporting events and/or games of chance (or games of skill) remote from an EGM and a gaming table. For example, as seen in FIG. 1, the gaming establishment fund management system includes a second cashless wagering system (not shown) that maintains a Sports Wagering Wallet 112 (e.g., a second cashless wagering account) which is in communication with the enterprise wallet 104. In this example, to facilitate the transfer of funds between this cashless wagering account and a credit meter associated with a sporting event wagering system (not shown) and/or a remote wagering system (not shown) to enable the placement of one or more wagers on one or more sporting events and/or one or more games of chance (or games of skill), the system utilizes a mobile device 110 running a mobile device application that interfaces with one or more components of the gaming establishment fund management system to enable, amongst other activities, a user, such as a user remote from the gaming establishment, access to this second cashless wagering account.

In various embodiments, in addition to or an alternative of maintaining one or more cashless wagering accounts via one or more cashless wagering systems, the gaming establishment fund management system includes or is otherwise associated with one or more gaming establishment retail wallet systems that each maintain one or more gaming establishment retail accounts. In different embodiments, funds held in zero, one or more of these gaming establishment retail accounts are accessible in association with (or otherwise configured to be accessible upon one or more inputs from a user and/or gaming establishment personnel) a potential procurement of a ticket voucher.

In certain embodiments, such a gaming establishment retail account (e.g., a gaming establishment retail wallet) of a gaming establishment retail wallet system integrates with various retail point-of-sale systems throughout the gaming establishment (or located remote from the gaming establishment, but otherwise associated with the gaming establishment) to enable users to purchase goods and/or services via the user's gaming establishment retail account. For example, as seen in FIG. 1, the gaming establishment fund management system includes a gaming establishment retail wallet system (not shown) that maintains a Retail Wallet 114 (e.g., a gaming establishment retail account) which is in communication with the enterprise wallet 104. In this example, to facilitate the transfer of funds between this gaming establishment retail account and an account associated with a gaming establishment retailer to purchase goods and/or services from the gaming establishment retailer, the system utilizes a retail wallet identity, such as a mobile device 110 running a mobile device application that interfaces with a point-of-sale terminal 116 of a retail point-of-sale system 118 of the gaming establishment retailer and/or a physical instrument (e.g., a smart card or a user issued magnetic striped card which the user utilizes in association with the point-of-sale terminal), and one or more components of the gaming establishment fund management system to enable a user access to this gaming establishment retail account. In other embodiments, the gaming establishment fund management system does not maintain a separate gaming establishment retail account, but rather utilizes the gaming establishment retail wallet system as a transaction coordinator to account for any transactions to purchase goods and/or services from a gaming establishment retailer.

In certain embodiments, a gaming establishment retail account is a retail account associated with a user having a balance or a pre-paid access account which, per current regulations from the U.S. Treasury Department Financial Crimes Enforcement Network ("FinCEN"), cannot be convertible to cash and can only be used for the purchase of goods and/or services. In these embodiments, such a gaming establishment retail account integrates with various retail point-of-sale systems of various retail establishments throughout or otherwise associated with a gaming establishment to enable users to purchase goods and/or services via the user's gaming establishment retail account. Accordingly, in certain embodiments, based on one or more jurisdictional regulations, an amount of funds deposited in a gaming establishment retail account may be used with various retail point-of-sale systems throughout the gaming establishment (or remote from, but otherwise associated with the gaming establishment) to enable users to purchase goods and/or services, but such funds deposited in the gaming establishment retail account cannot be converted to cash or check. In certain other embodiments, based on one or more different jurisdictional regulations, an amount of funds deposited in a gaming establishment retail account, such as an account associated with an identified user, may be used with various retail point-of-sale systems throughout the gaming establishment (or remote from, but otherwise associated with the gaming establishment) to enable users to purchase goods and/or services wherein such funds deposited in the gaming establishment retail account may be converted to or otherwise redeemable for cash or check.

In certain embodiments, the gaming establishment fund management system that maintains one or more gaming establishment accounts is in communication with an external funding system (i.e., a payment gateway) that is in communication with a network of one or more banks or other financial institutions which operate to electronically transfer funds between the user's accounts maintained at such banks or financial institutions and one or more of the accounts maintained by the gaming establishment fund management system. For example, as seen in FIG. 1, the gaming establishment fund management system that maintains the enterprise wallet 104 is in communication with an external funding system 120 which is in communication with a network of one or more banks or other financial institutions (i.e., the banking networks 122) which operate to electronically transfer funds from the user's accounts maintained at such banks or financial institutions to one or more of the accounts maintained by the gaming establishment fund management system and/or provide financial information associated with the user's accounts maintained at such banks or financial institutions. In certain embodiments, the gaming establishment fund management system that maintains one or more gaming establishment accounts includes an external funding system that is in communication with a network of one or more banks or other financial institutions which operate to electronically transfer funds between the user's accounts maintained at such banks or financial institutions and one or more of the accounts maintained by the gaming establishment fund management system. In certain embodiments, such external accounts include, but are not limited to, one or more checking accounts maintained by one or more financial institutions (e.g., one or more banks and/or credit unions), one or more savings accounts maintained by one or more financial institution accounts, such as a brokerage account, maintained by one or more financial institutions, one or more credit card accounts maintained by one or more financial institutions, one or more debit card accounts maintained by one or more financial institutions, and/or one or more third-party maintained accounts (e.g., one or more PayPal® accounts or Venmo® accounts). In different embodiments, the system utilizes a mobile device running a mobile device application, a kiosk, a gaming device (e.g., an interface of an EGM or gaming table component), an externally controlled service window displayed by a gaming device (e.g., a remote host controlled service window displayed by an EGM), a component of a gaming establishment patron management system, such as a player tracking unit, and/or a gaming establishment interface to interact with the external funding system to facilitate the transfer of funds to/from an external account. It should be appreciated that while described as the gaming establishment fund management system being in communication with the external funding system, in different embodiments, any system or sub-system of the present disclosure can be in communication with one or more external funding system.

In certain embodiments, the gaming establishment fund management system is in communication with one or more gaming establishment ticket voucher management systems which each issue one or more ticket vouchers and/or process any redeemed ticket vouchers. For example, as seen in FIG. 1, the gaming establishment fund management system that maintains the enterprise wallet 104 is in communication with a gaming establishment ticket voucher management system (i.e., the casino ticket system 124) to facilitate the procurement and redemption of zero, one or more ticket vouchers. In different embodiments, the system utilizes a mobile device running a mobile device application, a kiosk, a gaming device (e.g., an interface of an EGM or gaming table component), an externally controlled service window displayed by a gaming device (e.g., a remote host controlled service window displayed by an EGM), a component of a gaming establishment patron management system, such as a player tracking unit, and/or a gaming establishment interface to interact with the gaming establishment ticket voucher management system to facilitate the procurement and redemption of zero, one or more ticket vouchers. It should be appreciated that while described as the gaming establishment fund management system being in communication with the gaming establishment ticket voucher management system, in different embodiments, any system or sub-system of the present disclosure can be in communication with one or more gaming establishment ticket voucher management systems.

In certain embodiments, the gaming establishment fund management system is in communication with one or more credit systems which each issue the user one or more lines of credit or markers. For example, as seen in FIG. 1, the gaming establishment fund management system that maintains the enterprise wallet 104 is in communication with a gaming establishment credit system (i.e., the casino credit system 126) to facilitate the establishment of an amount of funds in one or more gaming establishment accounts via one or more lines of credits. In this example, to facilitate a transfer of funds from the line of credit issued by the credit system to a cashless wagering account (and then to a credit meter of an EGM 106 and/or a credit meter of a gaming table component (not shown) associated with a gaming table 108), the system utilizes a mobile device 110 running a mobile device application that interfaces with one or more components of the credit system to enable a user, such as a player of the EGM or a player at the gaming table, to apply for a line of credit, grant permission to review financial information associated with the user and/or access an amount of funds associated with an issued line of credit. In different embodiments, the system utilizes a mobile device running a mobile device application, a kiosk, a gaming device (e.g., an interface of an EGM or gaming table component), an externally controlled service window displayed by a gaming device (e.g., a remote host controlled service window displayed by an EGM), a component of a gaming establishment patron management system, such as a player tracking unit, and/or a gaming establishment interface to interact with the gaming establishment credit system to apply for a line of credit, grant permission to review financial information associated with the user and/or access an amount of funds associated with an issued line of credit. It should be appreciated that while illustrated as the gaming establishment fund management system being in communication with one or more credit systems, in different embodiments, any component or sub-system of the present disclosure can be in communication with one or more credit systems.

In certain embodiments wherein the gaming establishment fund management system is in communication with one or more credit systems which each issue the user one or more lines of credit or markers, the gaming establishment fund management system (and/or the gaming establishment credit system) maintains an outstanding line of credit meter or account which tracks the amount of funds owed to the gaming establishment credit system. In these embodiments, the gaming establishment fund management system maintains this outstanding line of credit meter or account to enable greater user flexibility in how they use the activated funds from a line of credit (when compared to a system that automatically pays back part or all of the funds from an activated line of credit with each cash out from each EGM).

In certain embodiments (not shown), the gaming establishment fund management system is also in communication with one or more credit reporting/credit risk systems which monitor and report on various accounts associated with the user. For example, the gaming establishment fund management system that maintains the enterprise wallet is in communication with one or more credit reporting and risk systems. These credit reporting and risk systems monitor and report on a credit rating and status of one or more accounts maintained for the user at various funding sources, such as various financial institutions. It should be appreciated that while illustrated as the gaming establishment fund management system being in communication with one or more credit reporting networks and one or more credit reporting/credit risk systems, in different embodiments, any component or sub-system of the present disclosure can be in communication with one or more credit reporting/credit risk systems.

In certain embodiments (not shown), the gaming establishment fund management system is in communication with one or more gaming establishment patron management systems that monitor activities at various points of contact associated with the gaming establishment and provides rewards, such as redeemable player tracking points, in association with such activities. It should be appreciated that while, in certain embodiments, the gaming establishment fund management system is in communication with one or more gaming establishment patron management systems, in different embodiments, any system or sub-system of the present disclosure can be in communication with one or more gaming establishment patron management systems. In different embodiments, the system utilizes a mobile device running a mobile device application, a kiosk, an interface of a gaming device (e.g., an interface of an EGM or gaming table component), an externally controlled service window displayed by a gaming device (e.g., a remote host controlled service window displayed by an EGM), a component of a gaming establishment patron management system, such as a player tracking unit, and/or a gaming establishment interface to interface with the gaming establishment patron management system.

In certain embodiments, the system utilizes one mobile device application to interact with the different components of the gaming establishment fund management system to, amongst other actions, access funds maintained in the different gaming establishment accounts associated with the user. For example, utilizing the same mobile application, a mobile device interacts with both the first cashless wagering system of the gaming establishment fund management system and the gaming establishment retail wallet system of the gaming establishment fund management system. In certain embodiments, the system utilizes multiple mobile device applications to interact with the different components of the gaming establishment fund management system to, amongst other actions, access funds maintained in the different gaming establishment accounts associated with the user. In certain of these embodiments, the mobile device applications include a location based digital wallet enabled application, such as a Passbook-enabled or Wallet-enabled application, which is accessible when the user enters a gaming establishment. In certain of such embodiments, the mobile device applications are downloaded to the mobile device from an application store. In certain of such embodiments, the mobile device applications are downloaded to the mobile device from one or more websites affiliated with the gaming establishment (which are accessible directly by the user and/or by a link opened when the user scans a QR code).

In different embodiments, in addition to or alternatively from utilizing a mobile device running a mobile device application to, amongst other actions, access funds associated with different gaming establishment accounts, the system utilizes a kiosk, a gaming establishment device (e.g., an interface of an EGM or gaming table component), an externally controlled service window displayed by a gaming establishment device (e.g., a remote host controlled service window displayed by an EGM), a display device/input device associated with a seat-level gaming table component, a display device/input device associated with a table-level gaming table component, a display device/input device associated with a mobile gaming table component, a component of a gaming establishment patron management system, such as a player tracking unit, a retail point-of-sale terminal, and/or a gaming establishment interface, such as a casino desk, to, amongst other actions, access the funds associated with such gaming establishment accounts. It should be appreciated that while illustrated in FIG. 1 as using a mobile device running a mobile device application to access funds associated with different gaming establishment accounts (e.g., a cashless wagering account and a gaming establishment retail account) as mentioned above, a physical instrument, such as a smart card or a user issued magnetic striped card may additionally or alternatively be utilized to enable a user access to one or more gaming establishment accounts.

In certain embodiments, the system enables a transfer of funds between different accounts maintained by different components associated with different gaming activities and/or non-gaming activities. In these embodiments, the system employs a service for interfacing with the various components to facilitate balance inquiry and transferring funds amongst the different accounts maintained by these various components. In certain embodiments, such a service collects data from various components and utilizes such collected data to provide a singular view of the balances (or a plurality of singular views of different groupings of balances). In certain embodiments, such a service additionally or alternatively provides facilities to enforce rules associated with the different accounts maintained by the various components. In different such embodiments, these rules include, but are not limited to, jurisdictional controls, self-imposed limits, state governmental controls and federal governmental controls, wherein the system provides the logic to determine how, and how much, to transfer from each account of the various interconnected components to satisfy a request for funds while staying within the confines of such rules. In certain embodiments, such a service additionally or alternatively tracks and coalesces transaction history across the accounts of the interconnected components of the system. In these embodiments, all transactions within the system have a "master" transaction record that ties all of the various fund transfers to a single initiating funds transfer regardless of how many accounts were withdrawn to the satisfy the original request.

In certain embodiments, as mentioned above, to enable a user to access funds in a gaming establishment account, such as a cashless wagering account, the system of the present disclosure utilizes a procurement of a ticket voucher. In these embodiments, rather than a user having to travel to a gaming establishment service desk and engage with gaming establishment personnel to withdraw funds held in a gaming establishment account (which requires time and effort of all parties involved and fosters the spread of diseases in such interactions), the system enables a user to obtain a ticket voucher associated with such funds and without having to interact with any gaming establishment personnel.

Specifically, the system enables a user to make one or more inputs, such as via an EGM, an externally controlled service window displayed by the EGM and/or a mobile device application executed on a mobile device, that result in a potential occurrence of a ticket voucher acquisition event. In these embodiments, the inputs made by the user in association with the potential occurrence of the ticket voucher acquisition event at least partially determine one or more subsequent actions undertaken to potentially procure a ticket voucher associated with an amount of funds withdrawn from a gaming establishment account maintained for that user. Since, in certain instances, responsive to a cashout input received at an EGM, funds from a credit meter of the EGM being played by an identified user having a gaming establishment account are automatically transferred to that gaming establishment account, the system utilizes one or more inputs made to potentially temporarily disable such an automatic transfer on cashout feature and further to enable the user to transfer additional funds from the gaming establishment account to be converted to a ticket voucher. As such, based on one or more actions undertaken by the user, the system causes a transfer of an amount of funds from a gaming establishment account maintained for a user to be issued as a ticket voucher by a component of a gaming establishment ticket management system. Accordingly, the system of the present disclosure supports the movement of funds from a gaming establishment account, such as a cashless wagering account, to a ticket voucher issued by an EGM and thus overcomes certain security concerns (e.g., users and/or gaming establishment personnel carrying large sums of cash) associated with cash-based gaming and provides for a relatively more efficient experience for users by reducing the quantity of touchpoints a user interacts with to obtain funds held in a gaming establishment account. In addition to providing a relatively safer environment via the reduction of uses of cash, the system of the present disclosure reduces face-to-face interactions between users and gaming establishment personnel, thereby reducing risks associated with the spread of diseases between such parties.

In certain embodiments, as part of the procurement of a ticket voucher associated with funds withdrawn from a gaming establishment account associated with a user, the system accounts for any activated lines of credit or markers associated with that user. In certain such embodiments, prior to issuing any ticket vouchers associated with funds drawn from a gaming establishment account maintained for the user, the gaming establishment ticket voucher management system operates with the gaming establishment credit system to determine if any amounts of funds are owed by that user on a line of credit. If an amount of funds are currently outstanding in association with an activated line of credit for that user, the gaming establishment ticket voucher management system operates with the gaming establishment credit system to determine if any restrictions or constraints are in place in association with the outstanding amount of funds owed on the line of credit. Put differently, based on the outstanding line of credit, the system determines zero, one or more factors that influence whether or not an amount of funds from a gaming establishment account can be accessed utilizing a ticket voucher. For example, if an amount of funds is currently owed on an activated line of credit, the system determines whether or not any additional monetary transactions may occur until part or all of the outstanding line of credit amount is paid off by the user.

In certain embodiments, the system of the present disclosure provides that the functionality to cashout funds from a gaming establishment account to a ticket voucher is unavailable to a user if the user has an outstanding marker amount. For example, the option to cashout an amount of funds from a cashless wagering account to a ticket voucher is not displayed by the applicable user interface or such an option is displayed by the applicable user interface but the displayed option is not available to be selected by the user. In certain embodiments, the system of the present disclosure provides that the ability to cashout funds from a gaming establishment account to a ticket voucher is modified if the user has an outstanding marker amount. In one such embodiment, the gaming establishment ticket voucher management system operates with the gaming establishment credit system and the gaming establishment fund management system to limit the amount in a gaming establishment account available to cashout to a ticket voucher is no more than an amount that ensures that funds still remain to pay back the amount owed on the outstanding line of credit. For example, if the user has $500 in a cashless wagering account available to be transferred to a credit meter of an EGM, and the user also has an outstanding marker amount of $400, the system imposes limits such that a ticket voucher valued at no more than $100 is available to be issued in accordance with a transfer of funds from the cashless wagering account.

In certain embodiments, the gaming establishment ticket voucher management system operates with the gaming establishment credit system and the gaming establishment fund management system to cause the user to first pay back part or all of the amount owed on the outstanding line of credit before having access to converting an amount of a gaming establishment account to a ticket voucher. In these embodiments, the system operates to ensure that part or all of an amount of funds owed in association with an activated line of credit are paid back prior to making funds maintained in a gaming establishment account available via the issuance of a ticket voucher. In one such embodiment, the system provides one or more reminders that the user must pay back their outstanding marker amount before the cashout to ticket voucher feature of the present disclosure is enabled. In another embodiment, the system provides a user interface that enables the user to pay back their outstanding marker amount before the cashout to ticket voucher feature is enabled. In another embodiment, the system limits the amount available to cashout to a ticket voucher up to a total amount of funds (e.g., the balance of the EGM credit meter plus the balance of the cashless wagering account) minus the outstanding marker amount owed, and then the system performs both transactions (i.e., paying back the marker amount and issuing a ticket voucher) at the same time.

In certain embodiments, via the user performing an interaction with a user interface associated with an EGM (e.g., a user interface of the EGM and/or a user interface displayed by the EGM but at least partially controlled independent of the EGM, such as a remote host controlled service window displayed by the EGM), a user interface associated with a kiosk operable to at least issue a ticket voucher (e.g., a user interface of a kiosk and/or a user interface displayed by the kiosk but at least partially controlled independent of the kiosk), a user interface associated with a component of a gaming establishment management system (e.g., a user interface associated with a SMIB and/or a user interface displayed in association with the SMIB but at least partially controlled independent of the SMIB) and/or a user interface associated with a mobile device application being executed by a mobile device paired (directly or indirectly) with an EGM, the system potentially causes an amount of funds available, such as an amount of funds residing in one or more gaming establishment accounts, to be converted to a ticket voucher.

In certain embodiments wherein the user interface to access the cashout to ticket voucher feature of the present disclosure is presented using a mobile device application, the mobile device application prompts the user to cause the mobile device to engage the EGM (or kiosk), such as prompting the user to tap the mobile device to a designated portion of the EGM (or kiosk) or otherwise moving the mobile device to within a designated distance of a designated location of the EGM (or kiosk). Such engagement initiates a pairing or linkage between the mobile device and the EGM (or kiosk), wherein the pairing or linkage between the mobile device and the EGM (or kiosk) occurs via one or more applications being run or executed on the mobile device. In this example, after such engagement, the mobile device application communicates, via a wireless communication protocol (including, but not limited to: Bluetooth™, Bluetooth™ Low Energy ("BLE"), one or more cellular communication standards (e.g., 3G, 4G, 5G, 6G, LTE), one or more Wi-Fi compatible standards, and one or more short range communication protocols (e.g., a near field communication ("NFC") protocol), data to the EGM (or kiosk) associated with the potential conversion of an amount of funds to a ticket voucher.

Figure 2:
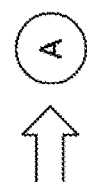
FIG. 2 is a series of example graphical user interfaces displayed in connection with one embodiment of issuing a ticket voucher with funds drawn from a gaming establish- ment account following an initial ticket voucher request action undertaken by a user and a subsequent cashout action undertaken by the user.
Figure 2:
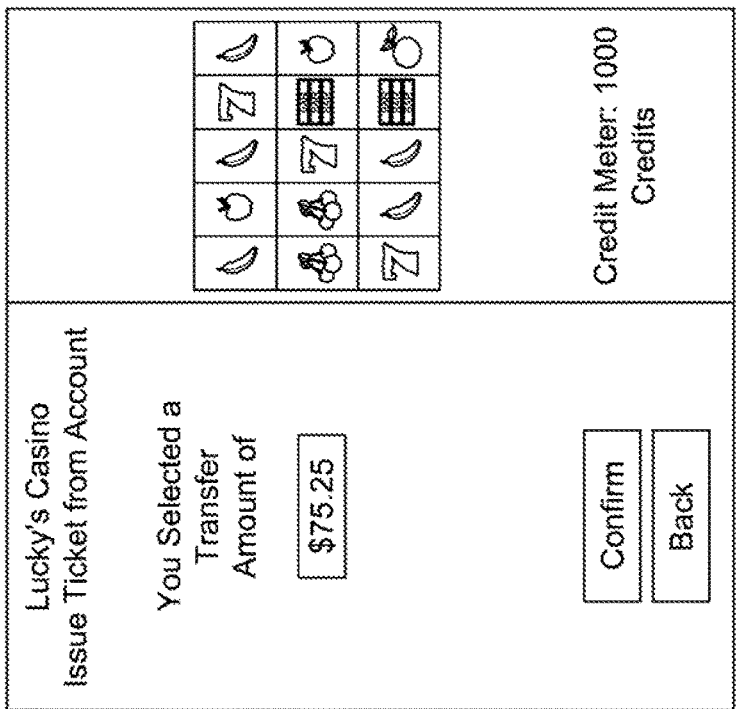
Figure 2:
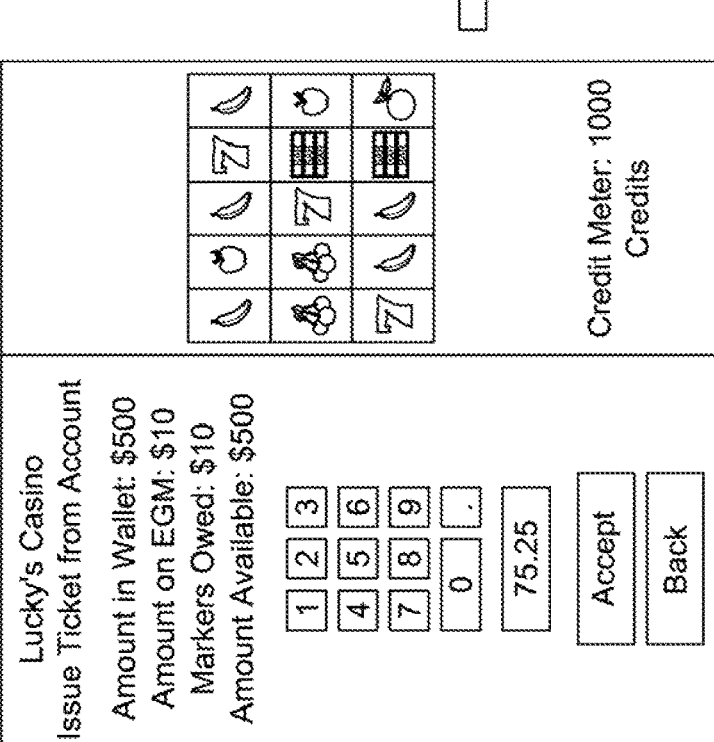
Figure 2:
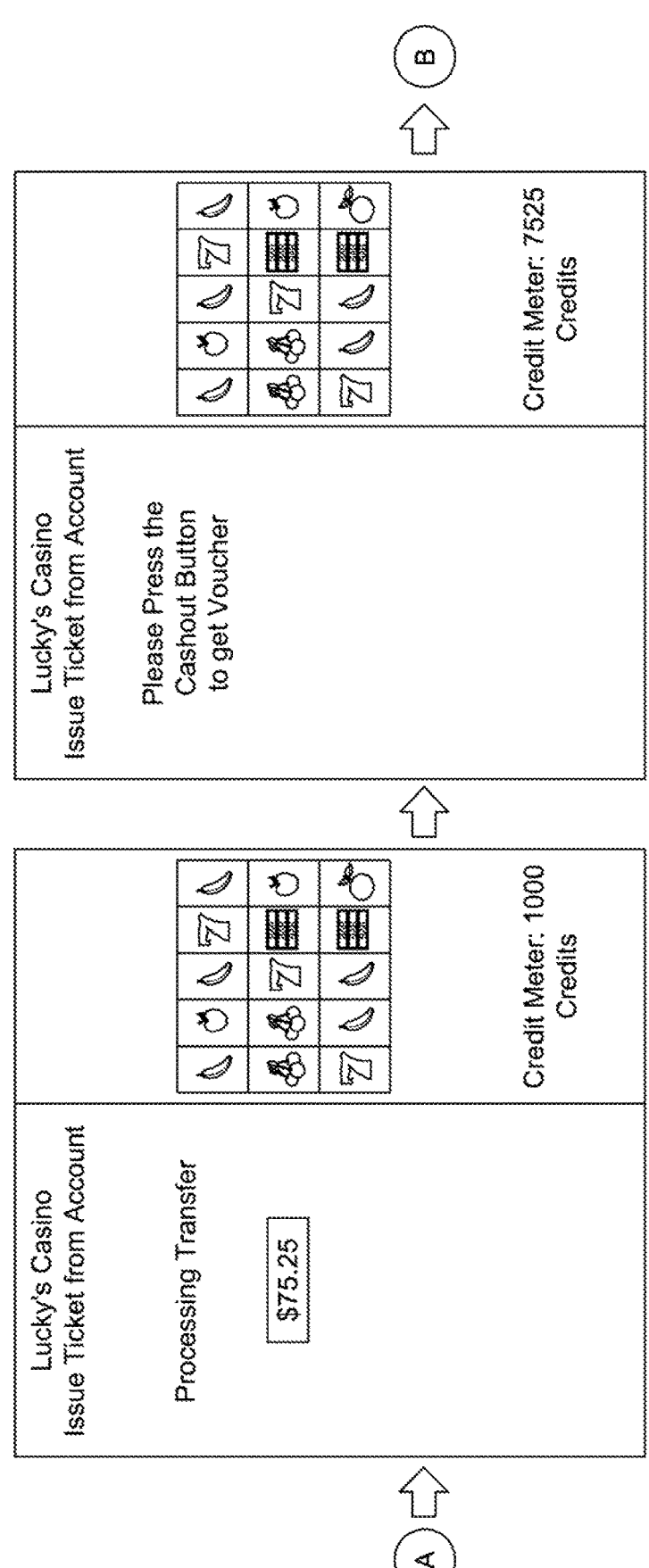
Figure 2:
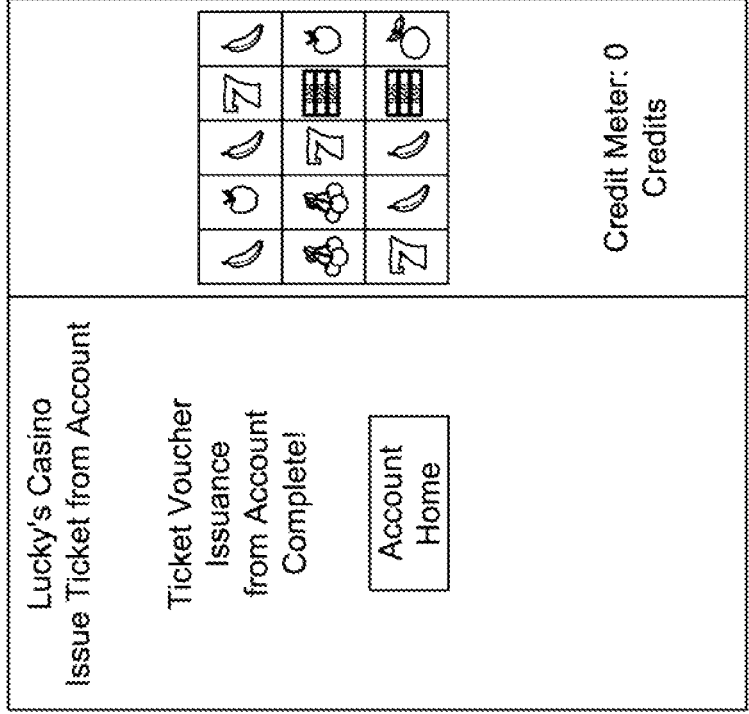
Figure 2:
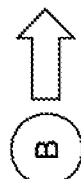

In certain embodiments, to potentially cause an amount of funds to be converted to a ticket voucher, the system determines an amount of funds available for conversion and employs one or more of the available user interfaces to display the determined amount to the user. For example, as seen in FIG. 2, via one or more inputs received by a user interface, the system determines that the user intends to potentially withdraw funds from a gaming establishment account via the conversion to a ticket voucher. In this example, following a ticket voucher request input, the system determines that since the EGM has a credit meter of $10 and the user has a balance of $500 in their cashless wagering account (i.e., the wallet) along with a debt of $10 owed on an outstanding marker, the user has $500 available to be converted to a ticket voucher.

Figure 3A:
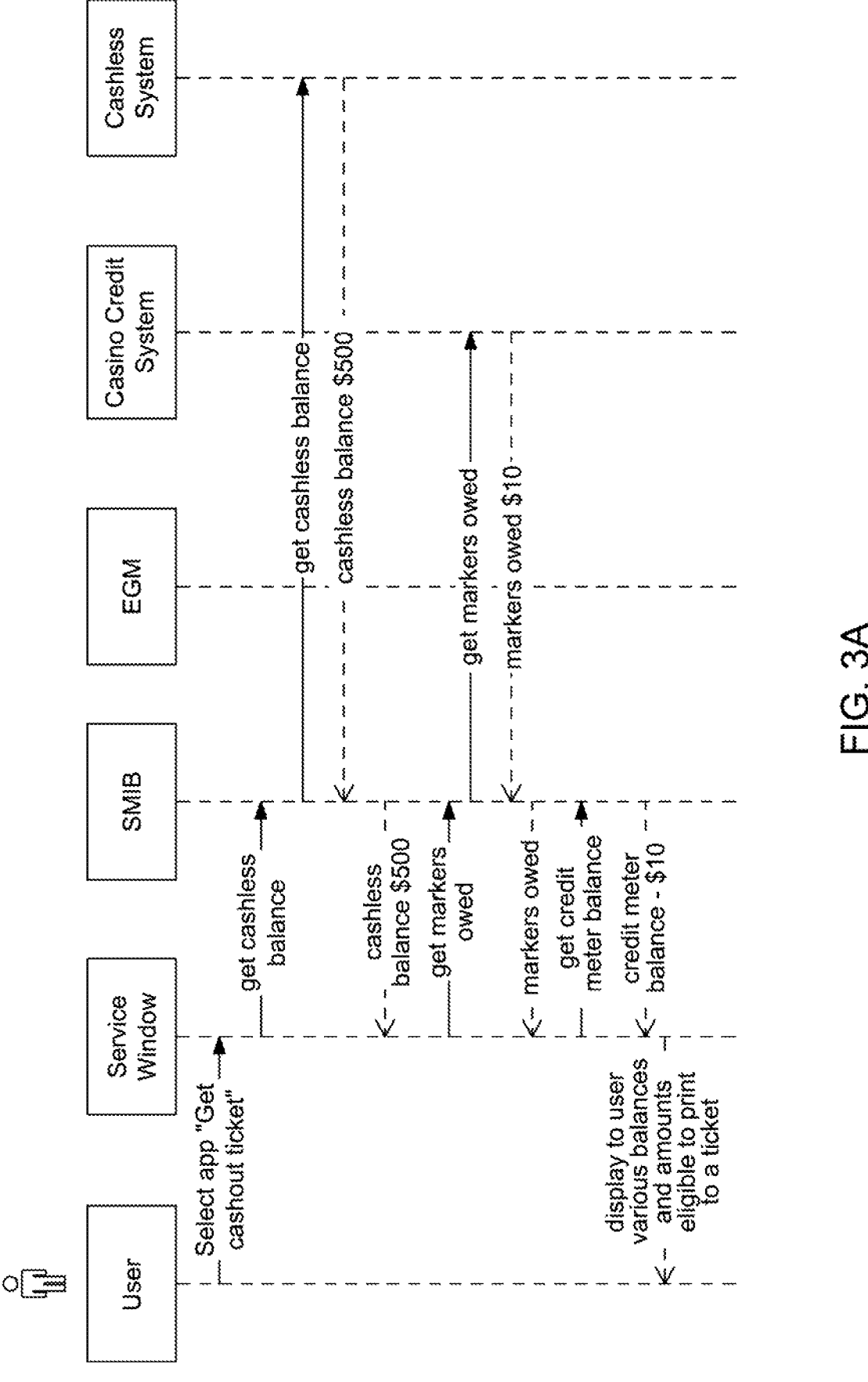
FIGS. 3A and 3B are flow charts of example processes of one embodiment for operating a system which employs a ticket voucher to access funds maintained in a gaming establishment account following an initial ticket voucher request action undertaken by a user and a subsequent cashout action undertaken by the user.

More specifically, in certain embodiments, different components of different systems operate together to determine an amount of funds available to be converted to a ticket voucher and cause the display of the determined amount of funds to the user. For example, as seen in FIG. 3A (which illustrates the described interactions between the user, an externally controlled service window displayed by an EGM, a SMIB associated with the EGM, the EGM, a component of a gaming establishment credit system (i.e., the casino credit system) and a component of a gaming establishment fund management system (i.e., the cashless system)), following a selection by a user evidencing an intent to potentially procure a ticket voucher, the system determines $500 available to be converted to a ticket voucher by accounting for the balance of the credit meter of the EGM (e.g., the $10 credit meter of FIG. 2), the balance of one or more gaming establishment accounts maintained for the user (e.g., the cashless balance of $500 of FIG. 3A) and, in this instance, any amounts owed on a line of credit issued to the user (e.g., the $10 marker owed of FIG. 3A).

In certain embodiments, following the determination of an amount of funds available for conversion, the system enables the user to request an amount of funds via one or more of the available user interfaces. For example, as seen in FIG. 2, with $500 available to be converted to a ticket voucher, the user employs an externally controlled service window displayed by the EGM to select an amount of $75.25 to be converted to a ticket voucher. In certain embodiments, if the user attempts to request an amount of funds greater than the amount of funds determined as available, the system rejects the request and enables the user to make another request of another amount of funds.

Figure 3B:
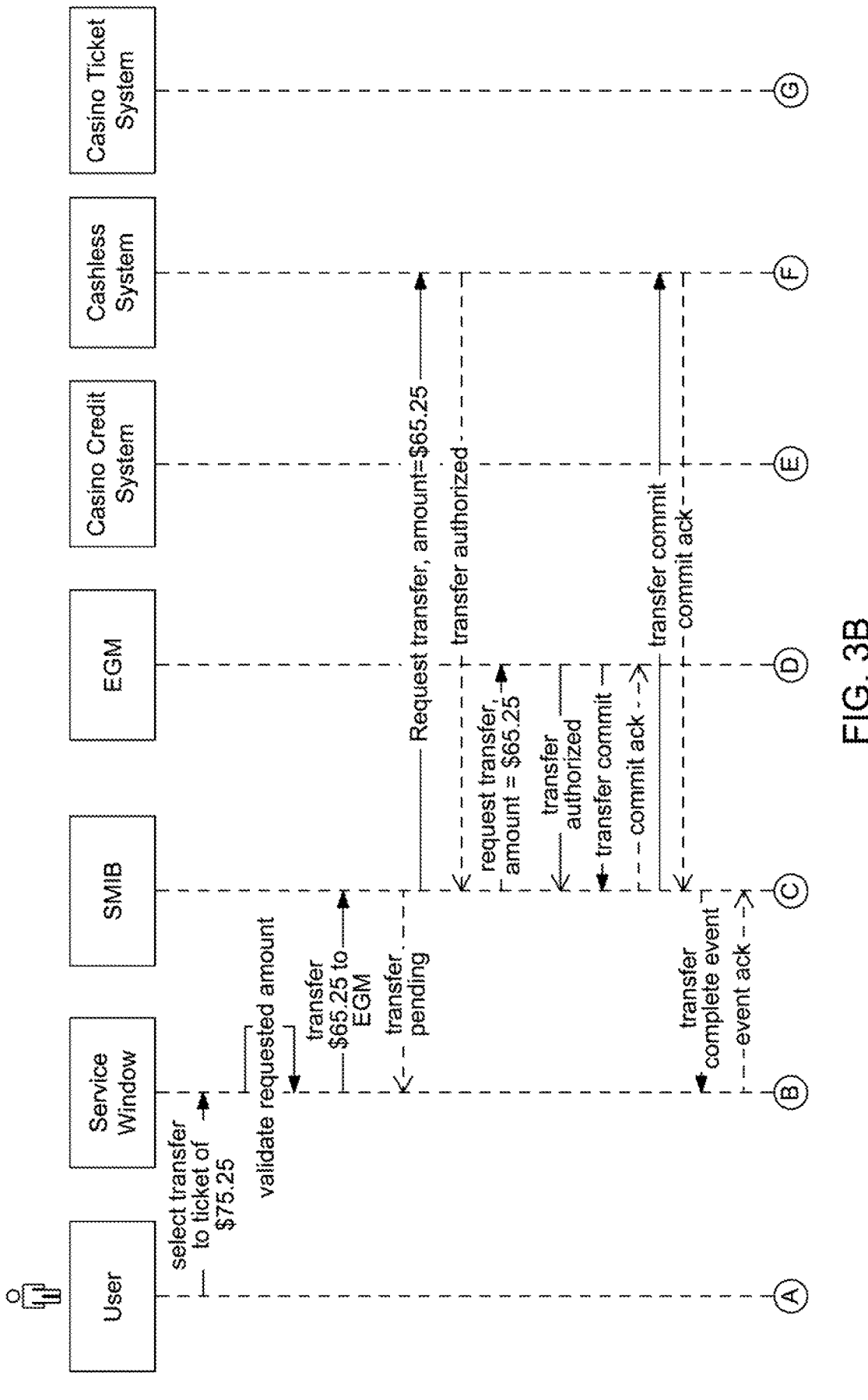
Figure 3B:
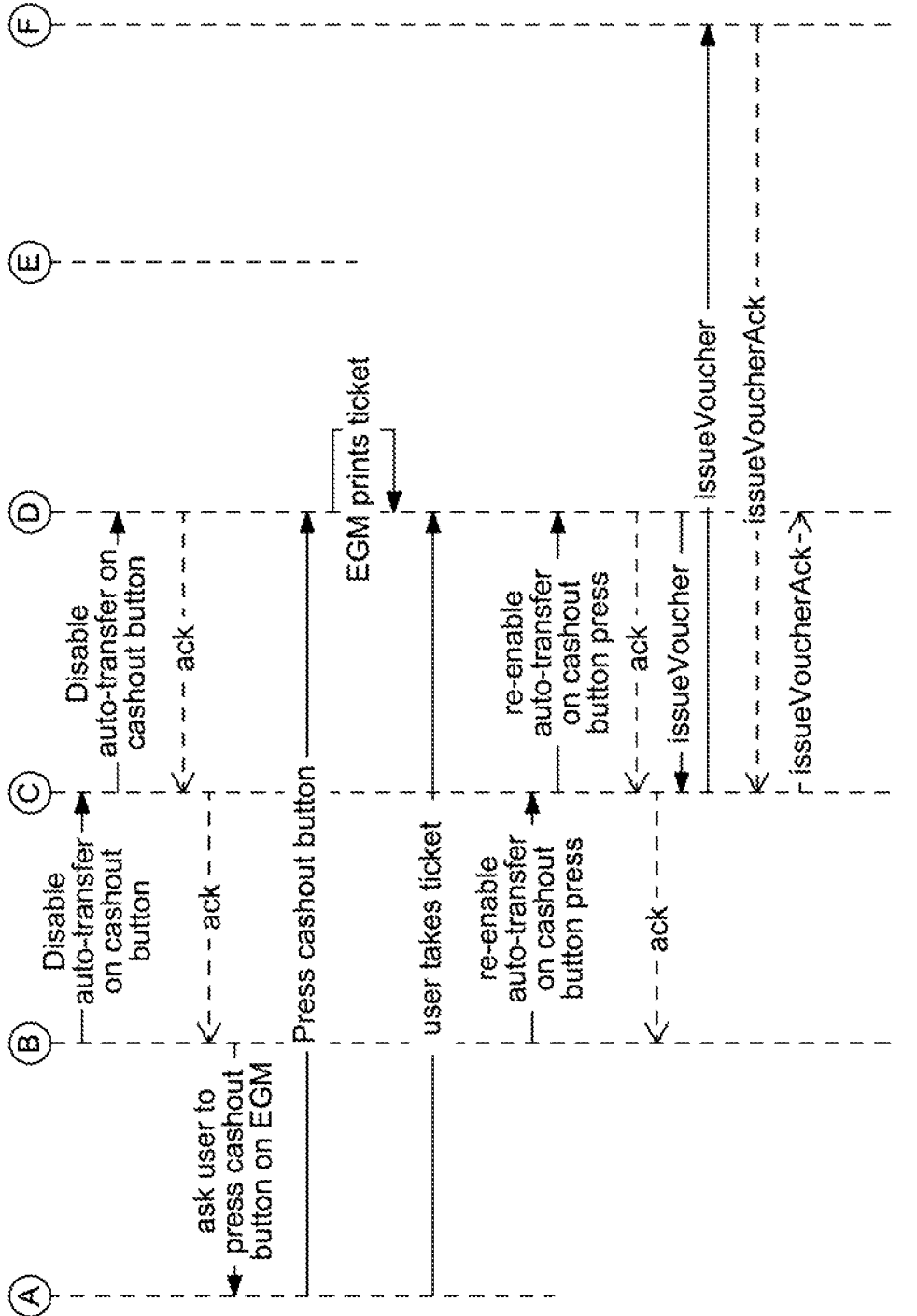

Following the user requesting an amount of available funds to be converted to a ticket voucher via one or more user interfaces, as seen in FIG. 3B (which illustrates the described interactions between the user, an externally controlled service window displayed by an EGM, a SMIB associated with the EGM, the EGM, a component of a gaming establishment fund management system (i.e., the cashless system), and a component of a gaming establishment ticket voucher management system (i.e., the casino ticket system)), the system transfers, from one or more gaming establishment accounts, an amount of funds that accounts for any amount currently residing on the credit meter of the EGM. In these embodiments, since the amount of funds of the credit meter of the EGM are not transferred to any gaming establishment account (because no cashout input is received by the EGM), in determining an amount of funds to transfer to the EGM from the gaming establishment account to total the amount of the requested ticket voucher, the system factors in the amount of the credit meter of the EGM.

More specifically, in certain embodiments, one or more components of the gaming establishment fund management system operate to cause the credit meter of the EGM to at least equal the requested amount of funds to be converted to a ticket voucher. In these embodiments, following a determination of an amount of funds that, when added to the amount of the credit meter of the EGM, results in the requested amount of funds to be converted to a ticket voucher, the one or more components of the system of the present disclosure, such as the SMIB, requests a transfer of that determined amount of funds from one or more gaming establishment accounts. The component of the gaming establishment fund management system then determines whether or not to approve the transfer of the requested amount of funds. In other words, upon the user's request of the issuance of a ticket voucher for an amount of funds at least partially held in one or more gaming establishment accounts, the gaming establishment fund management system logs the user into a gaming establishment account associated with the user (if necessary) and determines whether to authorize a transfer of an amount of funds needed to complete the requested transaction. In these embodiments, a component of the gaming establishment fund management system (e.g., one or more servers that maintain one or more gaming establishment accounts associated with the user) determines whether the amount of funds currently maintained in association with the gaming establishment account is at least equal to the requested amount of funds.

If the component of the gaming establishment fund management system is unable to approve the amount requested based on the amounts held in one or more gaming establishment accounts associated with the user and/or one or more applicable limits, the system notifies the user, via the applicable user interface and/or one or more messages, of the unavailability of issuing a ticket voucher with the amount of funds requested. For example, if one or more limits are associated with the gaming establishment account and/or the funds held in the gaming establishment account, the component of the gaming establishment fund management system declines the transaction (even if the amount of funds in the gaming establishment would otherwise cover the amount of funds of the requested ticket voucher). On the other hand, if the component of the gaming establishment fund management system approves the amount requested from one or more gaming establishment accounts associated with the user, the system transfers the amount requested to the credit meter of the EGM. Following such a transfer, the credit meter of the EGM contains at least the amount of funds requested to be converted to a ticket voucher. For example, as seen in FIG. 3B, the system determines that since $75.25 is requested to be cashed out to a ticket voucher and since the current credit meter of the EGM is $10.00, $65.25 is requested and approved to be transferred from the cashless wagering account to the credit meter of the EGM to enable the EGM to issue a ticket voucher associated with an amount of $75.25

Following the transfer of funds to the credit meter of the EGM, to enable a conversion of the credit meter of the EGM to the ticket voucher, the system disables the feature of the EGM that causes any cashed out amounts from the credit meter of the EGM to be automatically transferred to an applicable gaming establishment account. It should be appreciated that in accordance with certain EGM-to-host protocols, such as a slot accounting system ("SAS") protocol and a game-to-system protocol ("G2S"), when a cashout transaction is initiated (e.g., when a cashout button of the EGM is pressed) and an automatic transfer on cashout feature is enabled, the EGM expects a host, such as a component of a gaming establishment fund management system, to automatically initiate a transfer of the funds from the EGM's credit meter to a gaming establishment account associated with the user. As such, to facilitate the cashout to ticket voucher feature of the present disclosure, the system of certain embodiments temporarily disables such an automatic transfer on cashout feature to enable the credit meter of the EGM (which potentially includes funds transferred from a gaming establishment account) to be converted to a ticket voucher. In these embodiments, to avoid the amount of the credit meter of the EGM to be transferred to the gaming establishment account (and thus to eliminate the wasted computational resources and unnecessary bandwidth usage by transferring funds from a gaming establishment account to a credit meter of the EGM and then from the credit meter of the EGM back to the gaming establishment account), the system disables this automatic transfer on cashout feature such that the credit meter of the EGM will not be automatically transferred to the gaming establishment account when a cashout transactions occurs.

In certain embodiments, after disabling the automatic transfer on cashout feature, the system notifies the user to initiate a cashout transaction (e.g., press a cashout button) to obtain the ticket voucher associated with the requested amount. Following the user initiating the cashout transaction to obtain the ticket voucher, the system updates the credit meter of the EGM to reflect the exchange of an amount of funds for a ticket voucher and creates a ticket voucher for that amount of funds. For example, as seen in FIGS. 2 and 3B, following the user pressing the cashout button of the EGM, the EGM reduces the credit meter of the EGM from $75.25 to $0.00 to reflect the issuance of the ticket voucher associated with $75.25. In certain such embodiments, when the cashout button is pressed following the disablement of the automatic transfer on cashout feature, the EGM operates with the component of the ticket voucher management system to cause a ticket voucher associated with the amount of the credit meter of the EGM to be issued to the user, and cause a transfer of the amount of funds associated with the ticket voucher to an account associated with the gaming establishment ticket voucher management system. In such embodiments, the ticket voucher management system stores data associated with the issued ticket voucher to enable a subsequent redemption of the ticket voucher at a supported redemption touchpoint, such as at an EGM, a kiosk and/or a gaming establishment interface.

In certain embodiments, following the issuance of the ticket voucher, the system enables the feature of the EGM that causes any cashed out amounts from the credit meter of the EGM to be automatically transferred to an applicable gaming establishment account. In these embodiments, to again comply with certain EGM-to-host protocols, the system modifies the operation of the EGM to enable an automatic transfer on cashout feature such that the EGM again expects the host, such as a component of a gaming establishment fund management system, to automatically take the funds from the EGM's credit meter when the cashout button of the EGM is pressed. Accordingly, in certain embodiments, the system of the present disclosure enables an amount of funds from a gaming establishment account associated with a user to be transferred to a credit meter of an EGM and then cashed out to a ticket voucher temporarily bypassing any automatic transfers of funds back to the gaming establishment account.

It should be appreciated that while FIGS. 2, 3A and 3B illustrate a transfer of funds from an account of a cashless wagering system to the EGM, depending upon the amount selected by the user and the amount in different accounts associated with the user, additional transfers and/or messages may be required. In one such embodiment, dependent on the amount of the EGM's credit meter relative to the amount of funds in one or more gaming establishment accounts, transfers from multiple gaming establishment accounts associated with the user may be required to cause the credit meter of the EGM to at least equal the amount of the requested ticket voucher. In another such embodiment, dependent on the amount of the EGM's credit meter relative to the amount of funds in one or more gaming establishment accounts, a portion of the amount of funds of the credit meter is transferred to one or more of gaming establishment accounts as part of the overall transaction.

It should be further appreciated that while FIGS. 2, 3A and 3B illustrate certain components orchestrating part or all of the overall transaction via inputs received by the externally controlled service window displayed by the EGM, in different embodiments, one or more other components operate to determine the amount to be transferred to and/or from one or more gaming establishment accounts as well as enable and disable the automatic transfer on cashout feature. For example, a mobile device application being executed by a mobile device requests another component, such as the SMIB, to coordinate part or all of the overall transaction with components of the gaming establishment fund management system, the gaming establishment ticket voucher management system and/or the gaming establishment credit system. In this example, if the SMIB is coordinating the transaction, the SMIB receives a message from the mobile device application that specifies the amount the user wants to cashout to a ticket voucher, and then the SMIB determines the amounts to transfer to and/or from one or more gaming establishment accounts as well as to enable and disable the automatic transfer on cashout feature when required.

In certain embodiments, rather than inputs to potentially convert an amount of funds held in one or more gaming establishment accounts to a ticket voucher being received via a user interacting with content displayed by an externally controlled service window displayed by an EGM and/or via a user interacting with content displayed by a mobile device application, the system utilizes a cashout transaction, such as a user engaging a cashout button of an EGM, to initiate a ticket voucher creation sequence. In these embodiments, the user initially engaging the cashout button of the EGM triggers the system to prompt the user to make zero, one or more inputs via one or more applicable user interfaces to potentially convert an amount of funds held in one or more gaming establishment accounts to a ticket voucher independent of any transfer of funds to the credit meter of the EGM. In these embodiments, responsive to the initiation of the cashout transaction, the system automatically transfers the amount of funds of the credit meter of the EGM to a gaming establishment account associated with the user and prompts the user, via one or more applicable user interfaces, if the user would like to obtain a ticket voucher associated with an amount of funds available in the gaming establishment account. In such embodiments, the user can select yes to obtain a ticket voucher or cancel the request (or the cashout request can timeout via a timer, a removal of a user identification card, such as a player tracking card, from a card reader of the EGM (or associated with the SMIB) or a disassociation between the user's mobile device and the EGM (or the SMIB).

Figure 4:
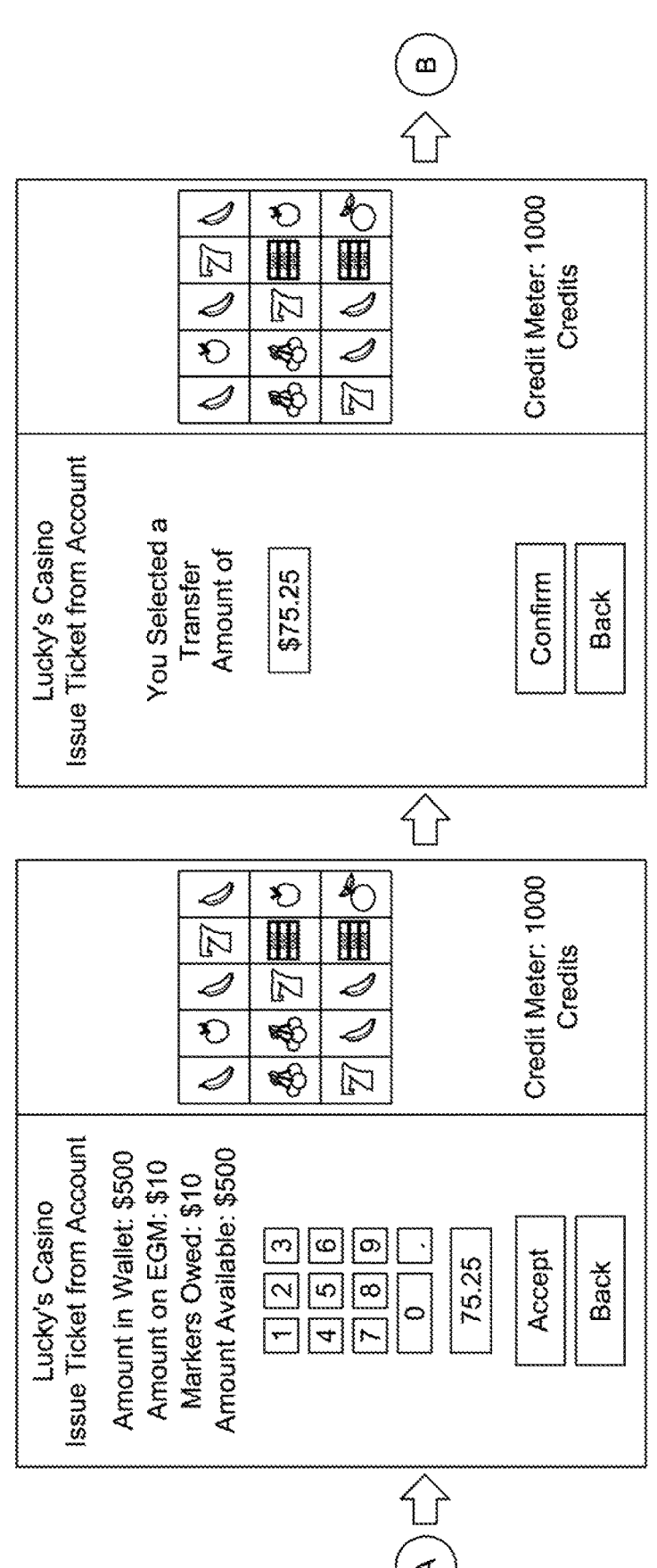
FIG. 4 is a series of example graphical user interfaces displayed in connection with another embodiment of issuing a ticket voucher with funds drawn from a gaming establishment account following an initial cashout action undertaken by a user and a subsequent ticket voucher request action undertaken by the user.
Figure 4:
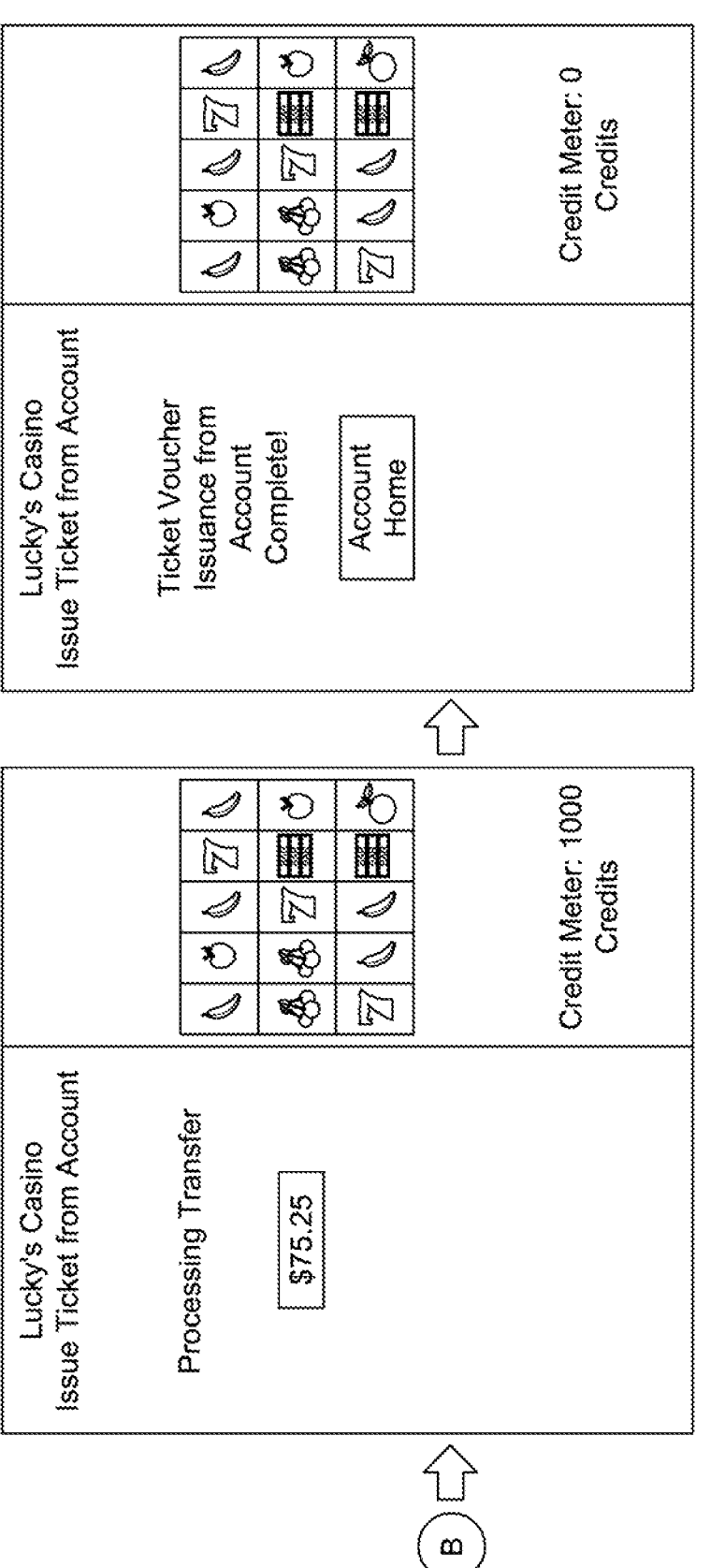

In certain embodiments, if the user indicates they would like to obtain a ticket voucher, the system determines an amount of funds available for conversion and employs one or more of the available user interfaces to convey the determined amount to the user. For example, as seen in FIG. 4, following the user pressing the cashout button of the EGM and making an input, within a designated period of time, to indicate that they would like a ticket voucher, the system determines that since the EGM has a credit meter of $10 (which is in the process of being transferred to the cashless wagering account) and the user has a balance of $500 (prior to the completion of the transfer of $10 from the credit meter of the EGM) in their cashless wagering account (i.e., the wallet) along with a debt of $10 owed on an outstanding marker, the user has $500 available to be converted to a ticket voucher.

Figure 5A:
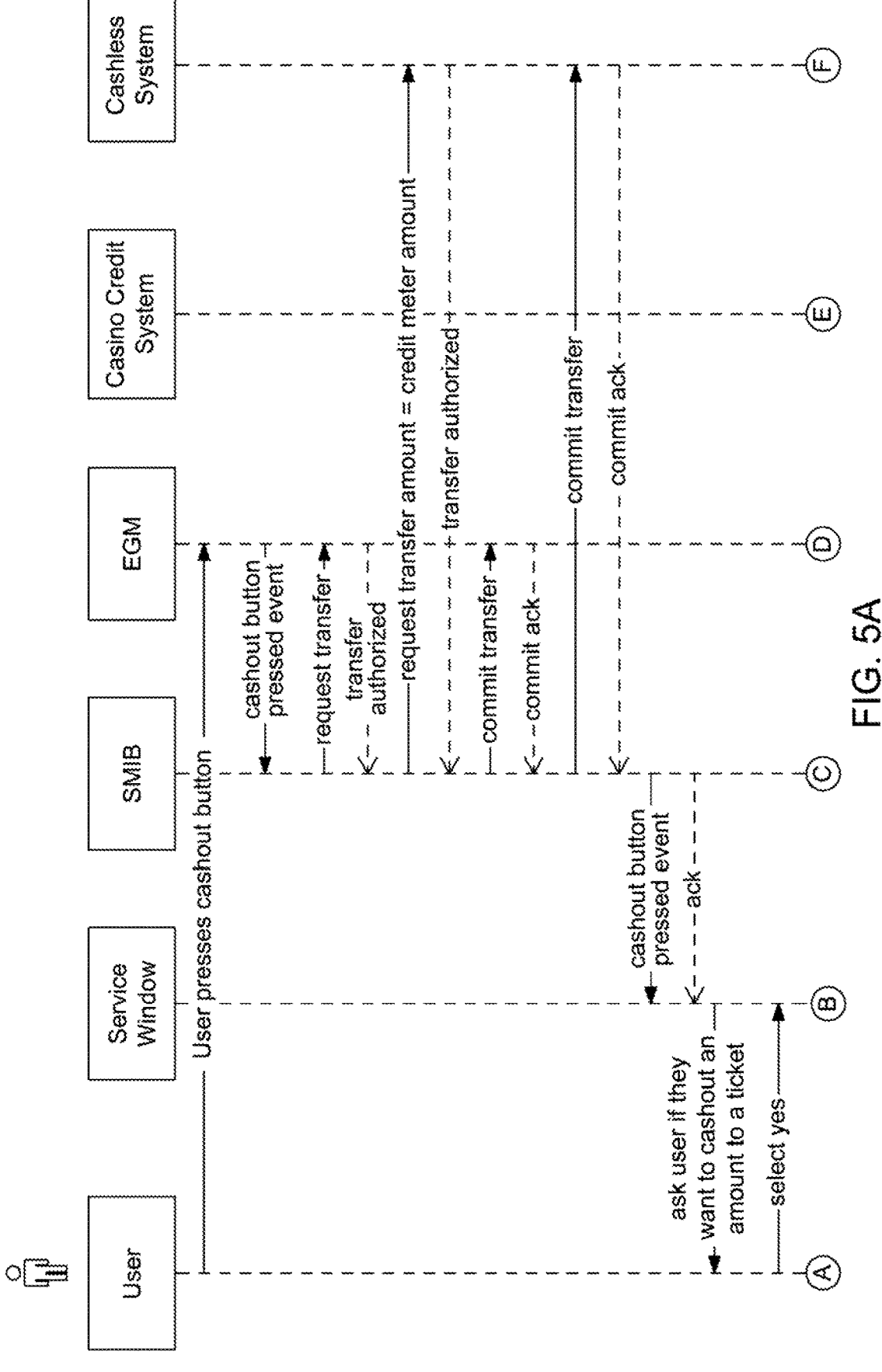
FIGS. 5A and 5B are flow charts of example processes of another embodiment for operating a system which employs a ticket voucher to access funds maintained in a gaming establishment account following an initial cashout action undertaken by a user and a subsequent ticket voucher request action undertaken by the user.
Figure 5A:
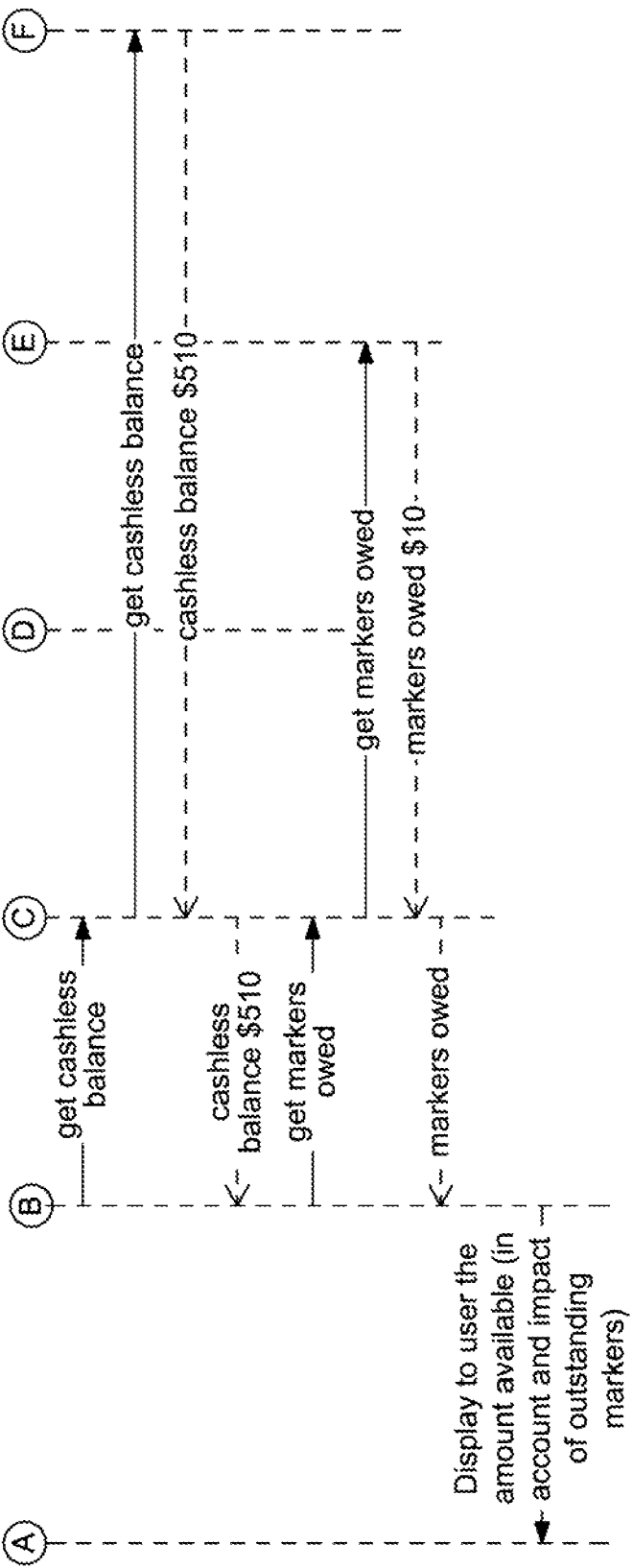

More specifically, in certain embodiments, different components of different systems operate together to determine and display an amount of funds available to be converted to a ticket voucher responsive to a user pressing the cashout button. For example, as seen in FIG. 5A (which illustrates the described interactions between the user, an externally controlled service window displayed by an EGM, a SMIB associated with the EGM, the EGM, a component of a gaming establishment credit system (i.e., the casino credit system) and a component of a gaming establishment fund management system (i.e., the cashless system)), responsive to a user pressing a cashout button of an EGM (which triggers an automatic transfer of an amount of funds of the credit meter of the EGM to a gaming establishment account associated with a user), the system determines an amount of funds available to potentially be converted to a ticket voucher. In this example, in determining the $500 available to be converted to a ticket voucher, the system accounts for the balance of one or more gaming establishment accounts maintained for the user (e.g., the post-EGM credit meter transfer cashless balance of $510 of FIG. 5A) and, in this instance, any amounts owed on a line of credit issued to the user (e.g., the $10 marker owed of FIG. 5A).

In certain embodiments, following the determination of an amount of funds available for conversion, the system enables the user to request an amount of funds via one or more of the available user interfaces. For example, as seen in FIG. 4, with $500 available to be converted to a ticket voucher, the user employs an externally controlled service window displayed by the EGM to select an amount of $75.25 to be converted to a ticket voucher. In certain such embodiments, if the user attempts to request an amount of funds greater than the amount of funds determined as available, the system rejects the request and enables the user to make another request of another amount of funds.

Figure 5B:
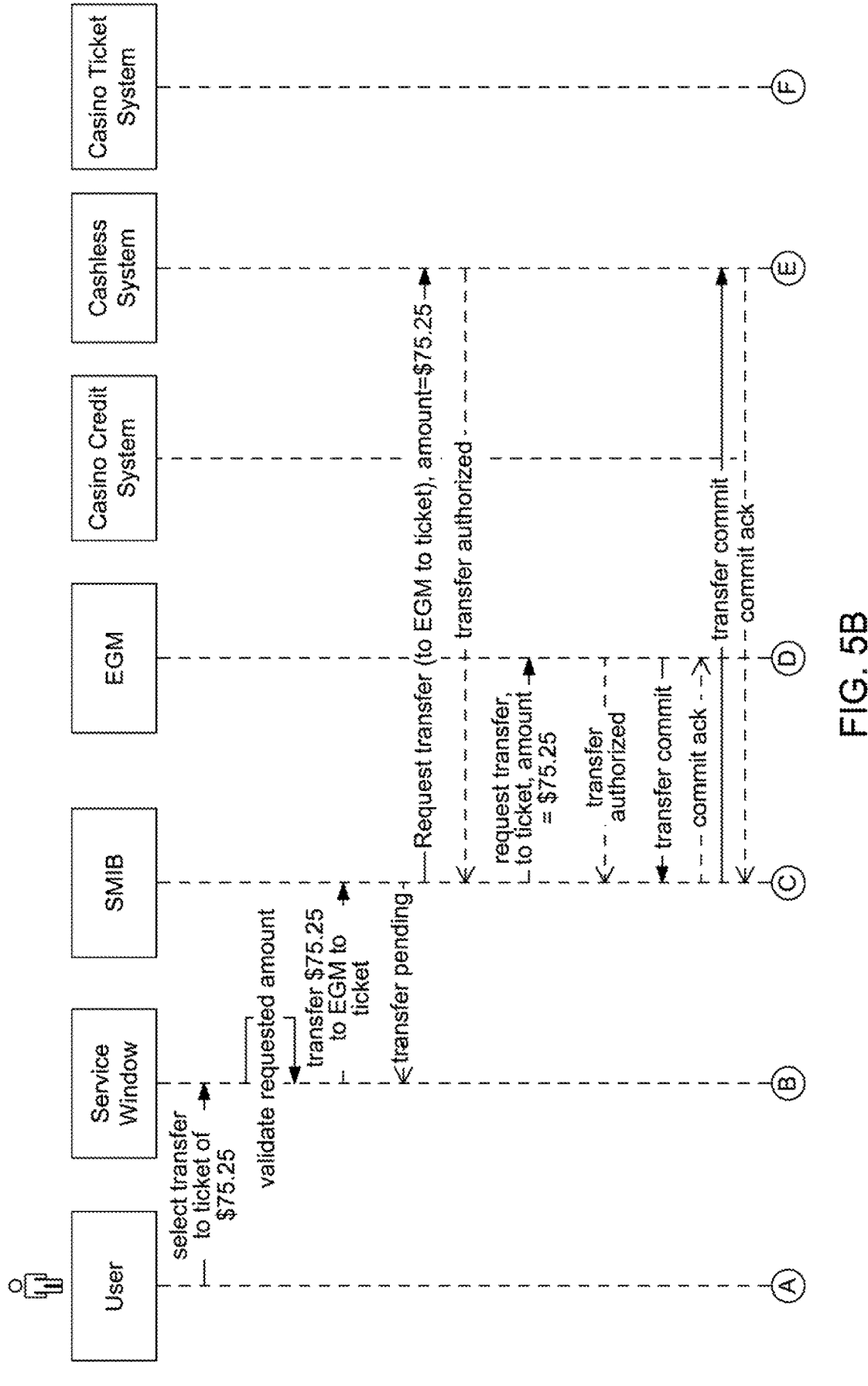
Figure 5B:
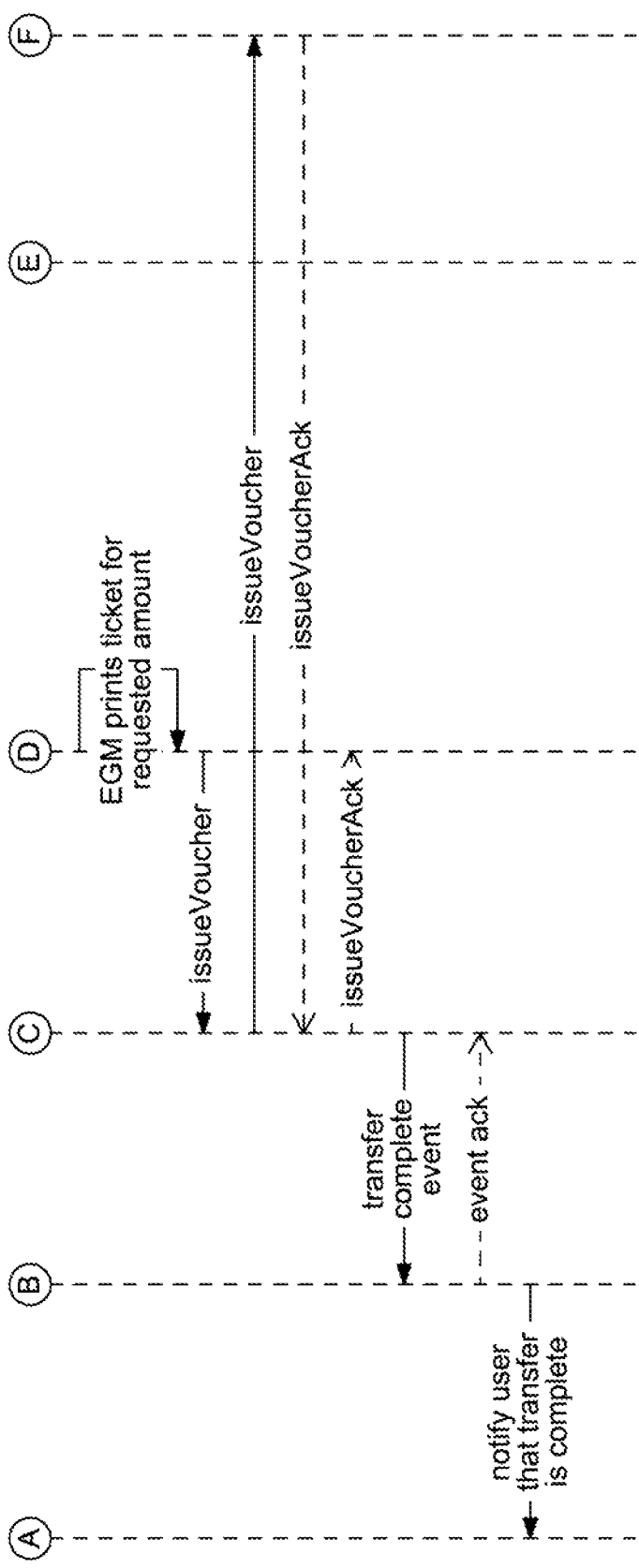

Following the user requesting an available amount of funds to be converted to a ticket voucher via one or more user interfaces, as seen in FIG. 5B (which illustrates the described interactions between the user, an externally controlled service window displayed by an EGM, a SMIB associated with the EGM, the EGM, a component of a gaming establishment fund management system (i.e., the cashless system), and a component of a gaming establishment ticket voucher management system (i.e., the casino ticket system)), the system attempts to issue a ticket voucher of the amount requested using funds from one or more gaming establishment accounts. In certain such embodiments, one or more components of the gaming establishment fund management system determines if the amounts associated with one or more gaming establishment accounts maintained for the user (after the transfer of any amount of funds from the credit meter of the EGM) is at least equal to the requested amount of funds to be converted to a ticket voucher. In these embodiments, following receipt of a ticket voucher creation request associated with an amount of funds from one or more gaming establishment accounts, the component of the gaming establishment fund management system determines whether or not to approve the request of the amount of funds. In such embodiments, upon the user's request of the issuance of a ticket voucher for an amount of funds held in one or more gaming establishment accounts, the gaming establishment fund management system logs the user into a gaming establishment account associated with the user (if necessary) and determines whether to authorize a transfer of the amount of funds which would result in a creation of a ticket voucher associated with that amount of funds. In these embodiments, a component of the gaming establishment fund management system (e.g., one or more servers that maintain one or more gaming establishment accounts associated with the user) determines whether the amount of funds currently maintained in association with the gaming establishment account is at least equal to the requested amount of funds.

If the component of the gaming establishment fund management system is unable to approve the amount requested based on the amounts held in one or more gaming establishment accounts associated with the user and/or one or more applicable limits, the system notifies the user, via the applicable user interface and/or one or more messages, of the unavailability of issuing a ticket voucher with the amount of funds requested. For example, if one or more limits are associated with the identified user, the component of the gaming establishment fund management system declines the transaction (even if the amount of funds in the gaming establishment would otherwise cover the amount of funds of the requested ticket voucher). On the other hand, if the system approves the amount requested, the system operates to cause a ticket voucher of the requested amount of funds to be issued to the user by the EGM (without any further inputs required of the user) and causes a transfer of the amount of funds associated with the ticket voucher to an account associated with the gaming establishment ticket voucher management system. That is, in operation of this embodiment, only one press of the cashout button by the user (to initiate the potential procurement of a ticket voucher) is required to result in the issuance of a ticket voucher for an amount of funds accessed from one or more gaming establishment accounts. The ticket voucher management system of this embodiment stores data associated with the issued ticket voucher to enable a subsequent redemption of the ticket voucher at a supported redemption touchpoint, such as at an EGM, a kiosk and/or a gaming establishment interface.

It should be appreciated that in this embodiment, since the amount of funds converted to the ticket voucher are not transferred to the credit meter of the EGM, but rather the EGM is used to issue the ticket voucher with the funds transferred to an account associated with the gaming establishment ticket management system, no disabling of any automatic transfer on cashout feature is needed. As such, since the amount of funds of the credit meter are transferred to the gaming establishment account when the user initially engages the cashout button (to initiate the potential ticket voucher creation sequence) and no subsequent engagement of the cashout button occurs as part of this ticket voucher creation sequence, no modifications to the operation of the EGM (to disable and then enable the automatic transfer on cashout feature) are needed. Accordingly, in certain embodiments, the system of the present disclosure enables an amount of funds from a gaming establishment account associated with a user to be converted to a ticket voucher without temporarily bypassing any automatic transfer of funds features.

It should be appreciated that while FIGS. 4, 5A and 5B illustrate a transfer of funds from an account of a cashless wagering system to a ticket voucher, depending upon the amount selected by the user and the amount in different accounts associated with the user, additional transfers and/or messages may be required. In one such embodiment, dependent on the amount of funds in one or more gaming establishment accounts, transfers from multiple gaming establishment accounts associated with the user may be required to form a total amount of funds at least equal the amount of the requested ticket voucher. It should be further appreciated that while FIGS. 4, 5A and 5B illustrate certain components orchestrating part or all of the overall transaction via inputs received by the externally controlled service window displayed by the EGM, in different embodiments, one or more other components operate to determine the amount to be transferred to and/or from one or more gaming establishment accounts. For example, a mobile device application being executed by a mobile device requests another component, such as the SMIB, to coordinate part or all of the overall transaction with components of the gaming establishment fund management system, the gaming establishment ticket voucher management system and/or the gaming establishment credit system. In this example, if the SMIB is coordinating the transaction, the SMIB receives a message from the mobile device application that specifies the amount the user wants to cashout to a ticket voucher, and then the SMIB determines the amounts to transfer to and/or from one or more gaming establishment accounts.

In certain embodiments, rather than inputs to potentially convert an amount of funds held in one or more gaming establishment accounts to a ticket voucher being received via a user interacting with content displayed by an externally controlled service window displayed by an EGM and/or via a user interacting with content displayed by a mobile device application, the system utilizes a cashout transaction, such as a user engaging a cashout button of an EGM, to initiate a ticket voucher creation sequence. In these embodiments, the user initially engaging the cashout button of the EGM triggers the system to prompt the user to make zero, one or more inputs via one or more applicable user interfaces to potentially convert an amount of funds held in one or more gaming establishment accounts to a ticket voucher via a transfer of funds to the credit meter of the EGM. In these embodiments, responsive to the initiation of the cashout transaction, the system automatically transfers the funds of the credit meter of the EGM to a gaming establishment account associated with the user and asks the user, via one or more applicable user interfaces, if the user would like to obtain a ticket voucher associated with an amount of funds available in the gaming establishment account. In these embodiments, the user can select yes to obtain a ticket voucher or cancel the request (or the cashout request can timeout via a timer, a removal of a user identification card, such as a player tracking card, from a card reader of the EGM (or associated with the SMIB) or a disassociation between the user's mobile device and the EGM (or the SMIB).

Figure 6:
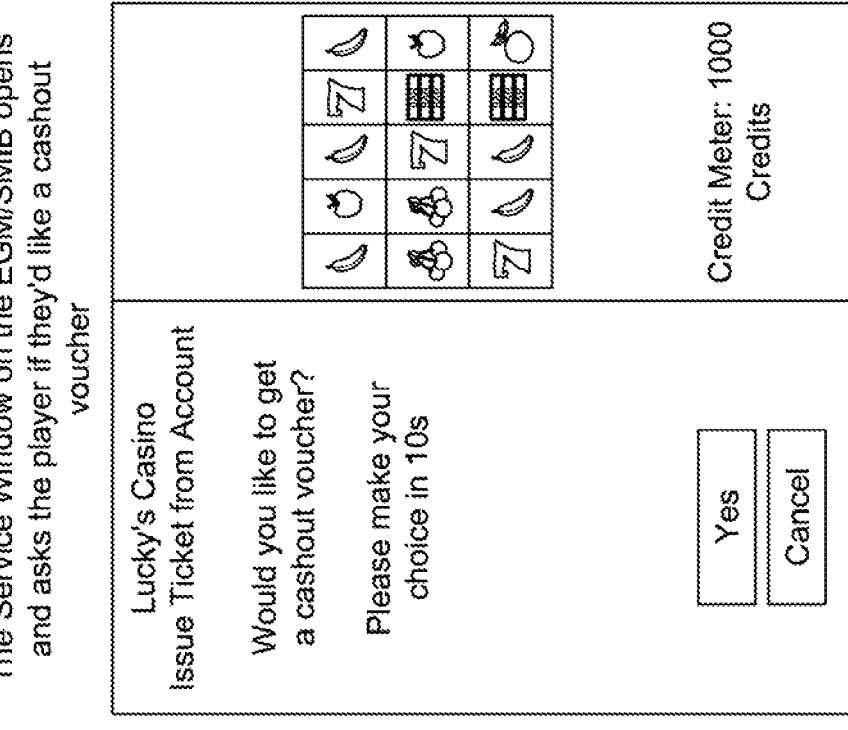
FIG. 6 is a series of example graphical user interfaces displayed in connection with another embodiment of issuing a ticket voucher with funds drawn from a gaming establishment account following an initial cashout action undertaken by a user and a subsequent cashout action undertaken by the user.
Figure 6:
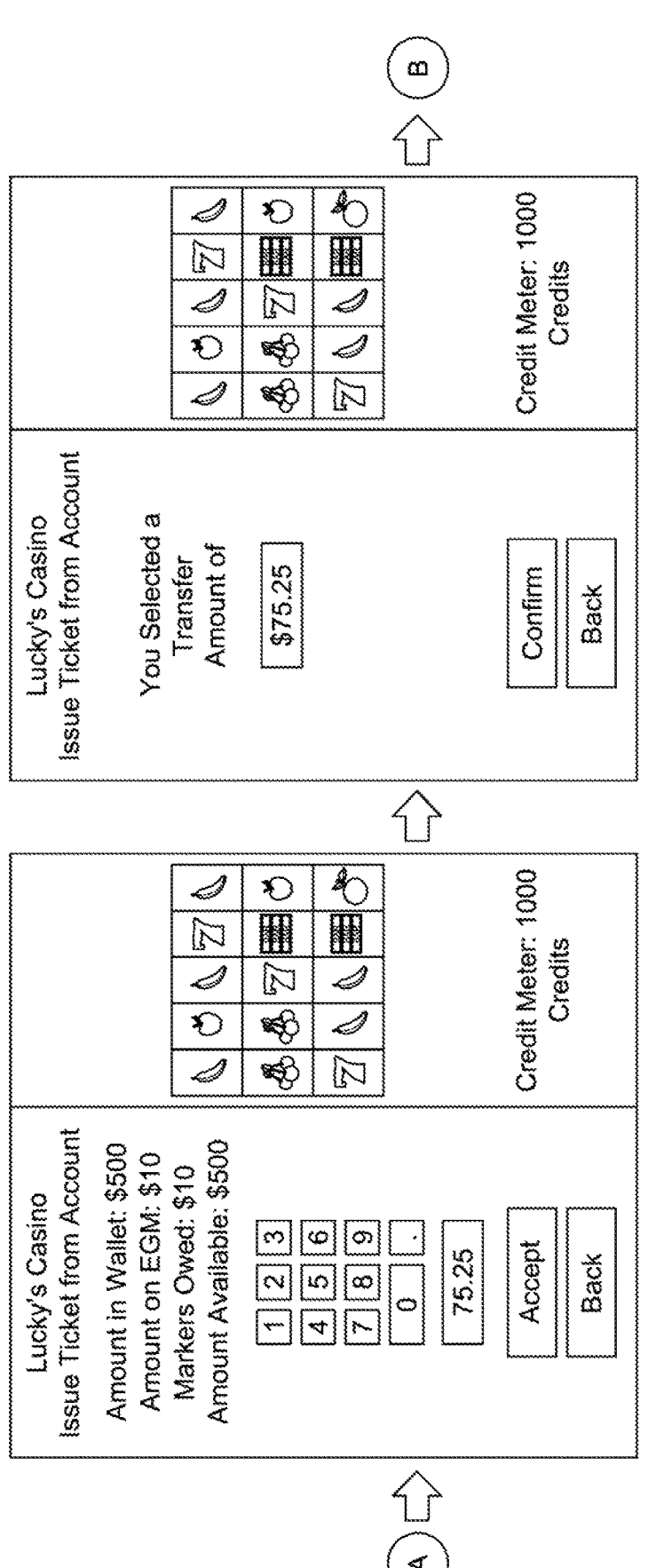
Figure 6:
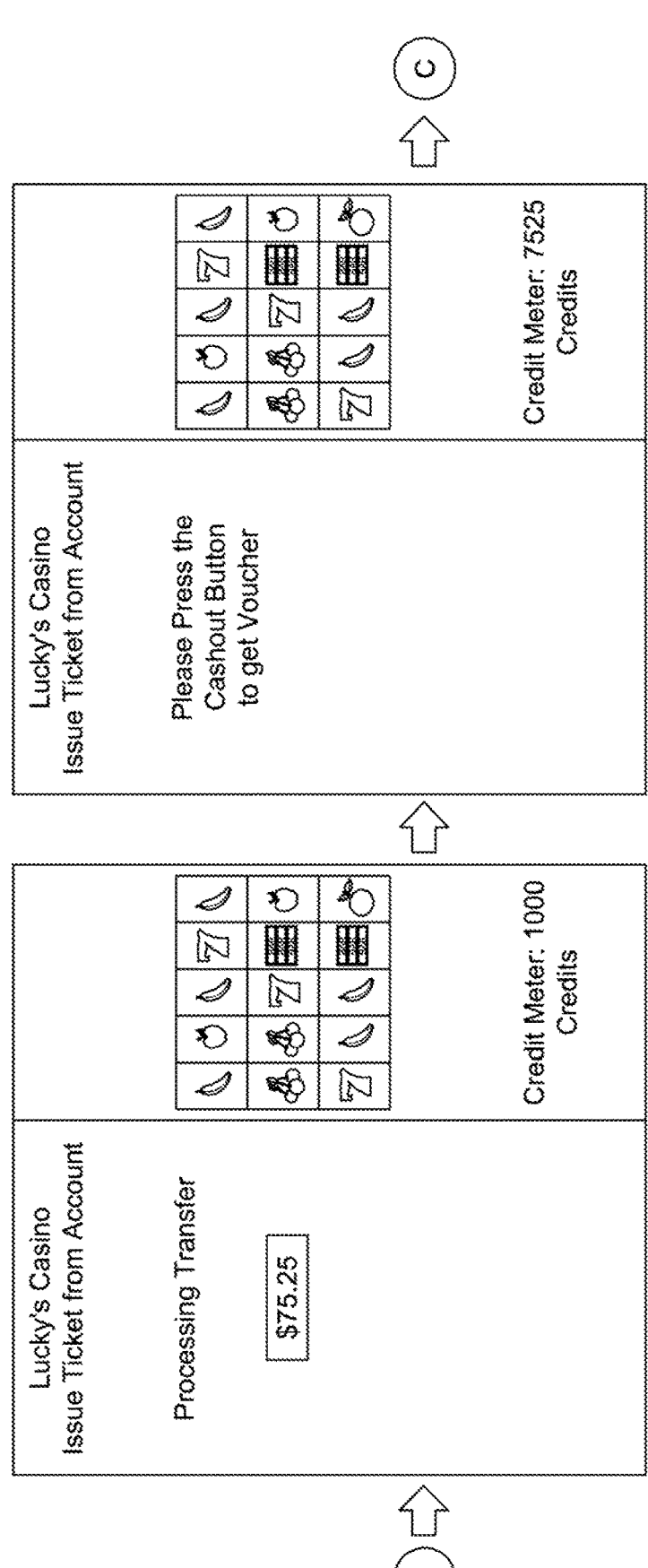
Figure 6:
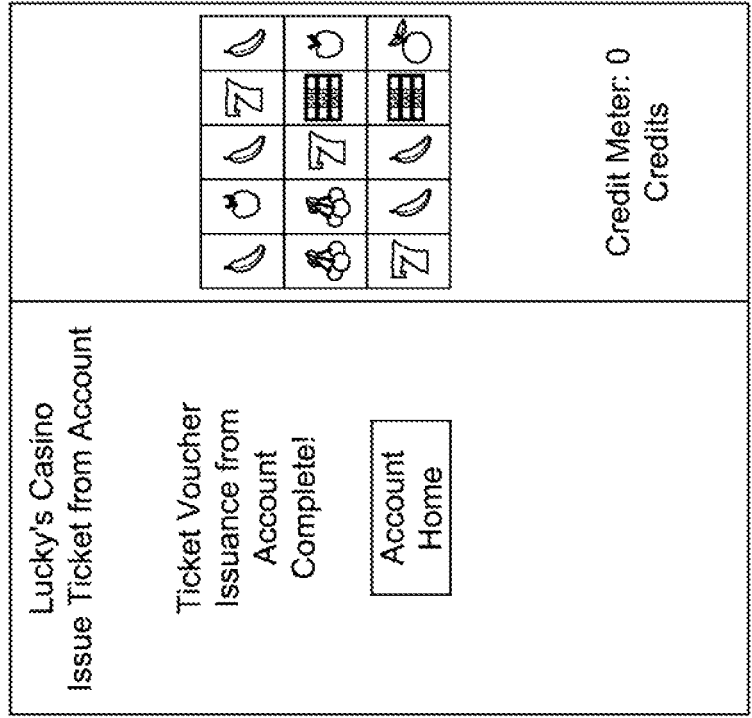
Figure 6:

In certain embodiments, if the user indicates they would like to obtain a ticket voucher, the system determines and displays an amount of funds available for conversion to a ticket voucher. For example, as seen in FIG. 6, following the user pressing the cashout button of the EGM and making an input, within a designated period of time, to indicate that they would like a ticket voucher, the system determines that since the EGM has a credit meter of $10 (which is in the process of being transferred to the cashless wagering account) and the user has a balance of $500 (prior to the completion of the transfer of $10 from the credit meter of the EGM) in their cashless wagering account (i.e., the wallet) along with a debt of $10 owed on an outstanding marker, the user has $500 available to be converted to a ticket voucher.

Figure 7A:
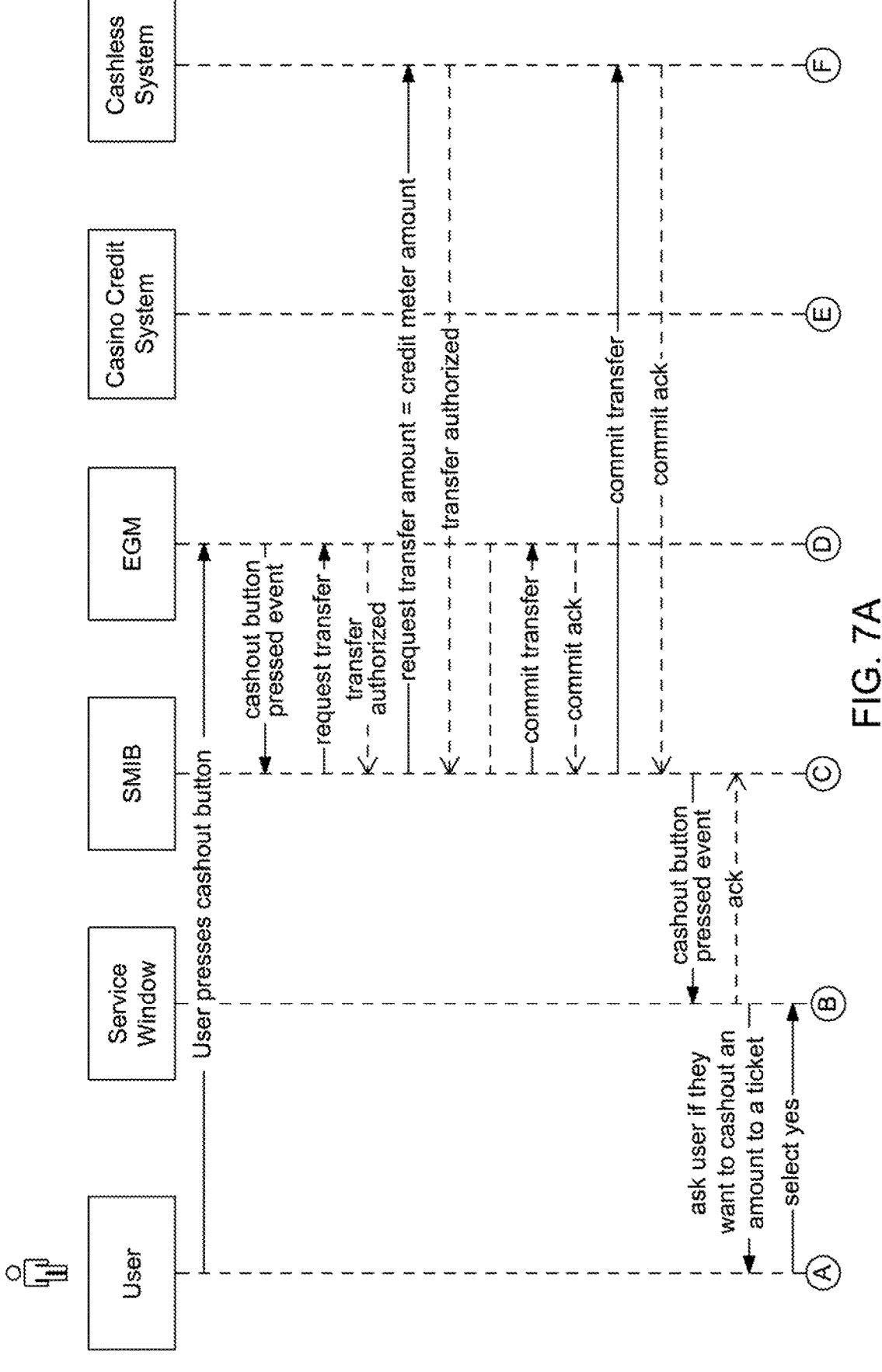
FIGS. 7A and 7B are flow charts of example processes of another embodiment for operating a system which employs a ticket voucher to access funds maintained in a gaming establishment account following an initial cashout action undertaken by a user and a subsequent cashout action undertaken by the user.
Figure 7A:
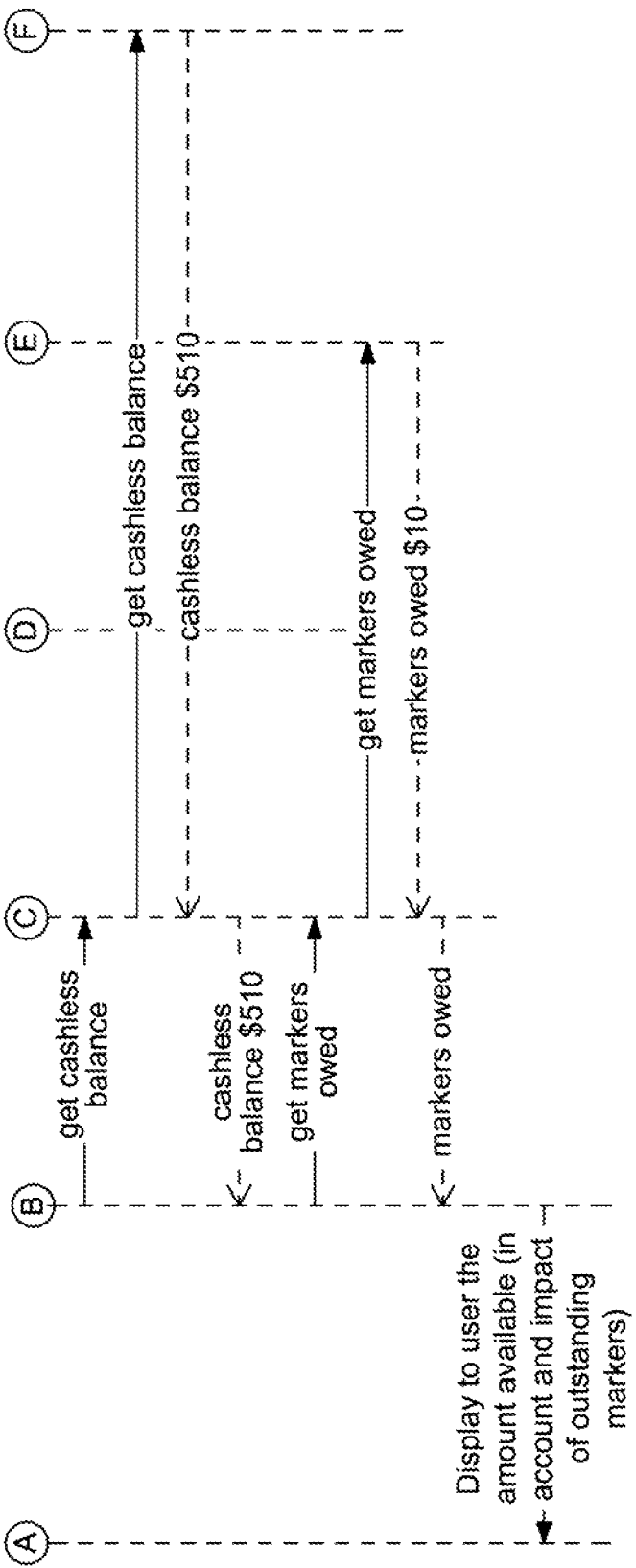

More specifically, in certain embodiments, different components of different systems operate together to determine and display an amount of funds available to be converted to a ticket voucher responsive to a user pressing the cashout button. For example, as seen in FIG. 7A (which illustrates the described interactions between the user, an externally controlled service window displayed by an EGM, a SMIB associated with the EGM, the EGM, a component of a gaming establishment credit system (i.e., the casino credit system) and a component of a gaming establishment fund management system (i.e., the cashless system)), responsive to a user pressing a cashout button of an EGM (which triggers an automatic transfer of an amount of funds of the credit meter of the EGM to a gaming establishment account associated with a user), the system determines an amount of funds available to potentially be converted to a ticket voucher. In this example, in determining the $500 available to be converted to a ticket voucher, the system accounts for the balance of one or more gaming establishment accounts maintained for the user (e.g., the post-EGM credit meter transfer cashless balance of $510 of FIG. 7A) and, in this instance, any amounts owed on a line of credit issued to the user (e.g., the $10 marker owed of FIG. 7A).

In certain embodiments, following the determination of an amount of funds available for conversion, the system enables the user to request an amount of funds via one or more of the available user interfaces. For example, as seen in FIG. 6, with $500 available to be converted to a ticket voucher, the user employs an externally controlled service window displayed by the EGM to select an amount of $75.25 to be converted to a ticket voucher. In certain such embodiments, if the user attempts to request an amount of funds greater than the amount of funds determined as available, the system rejects the request and enables the user to make another request of another amount of funds.

Figure 7B:
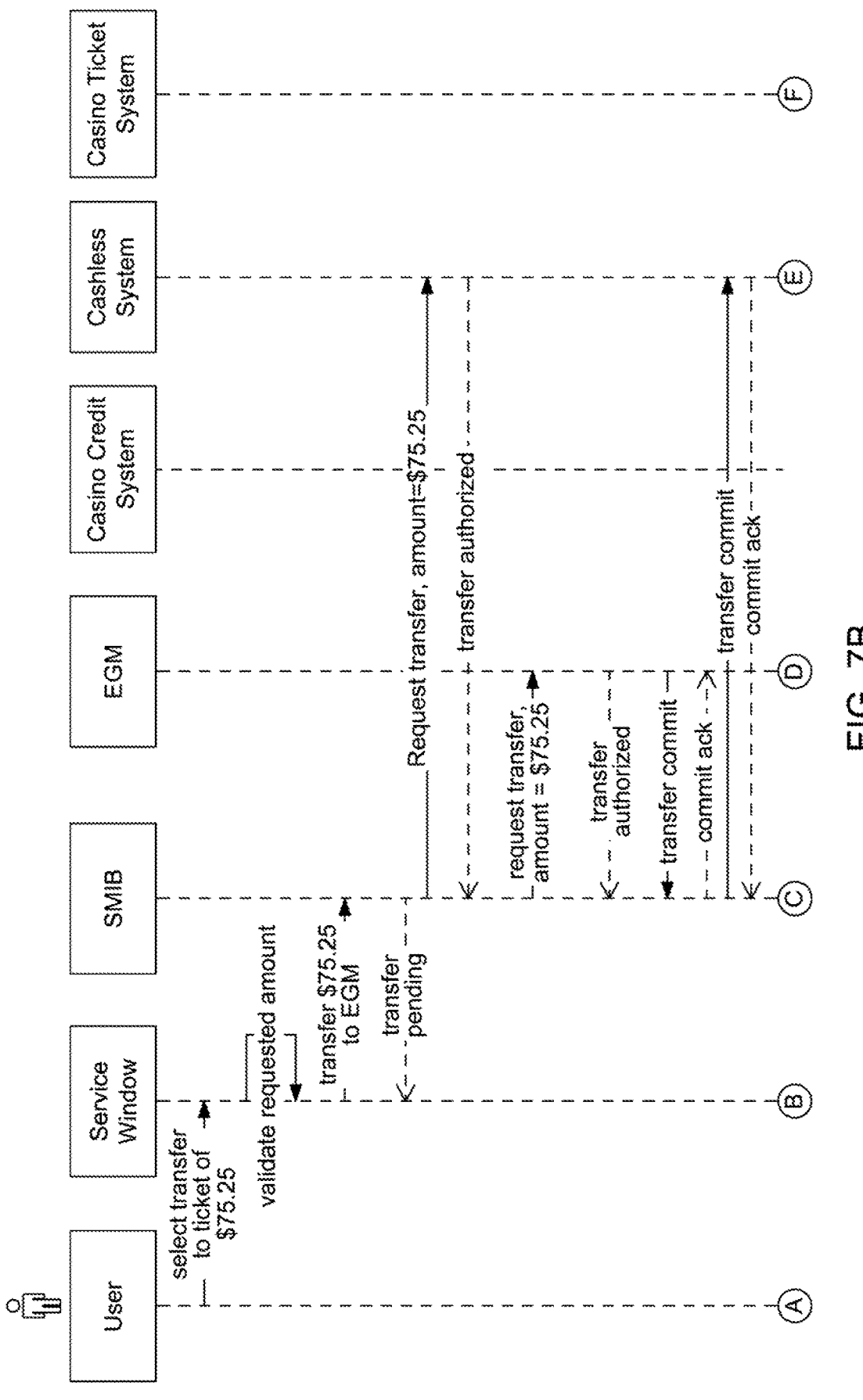
Figure 7B:
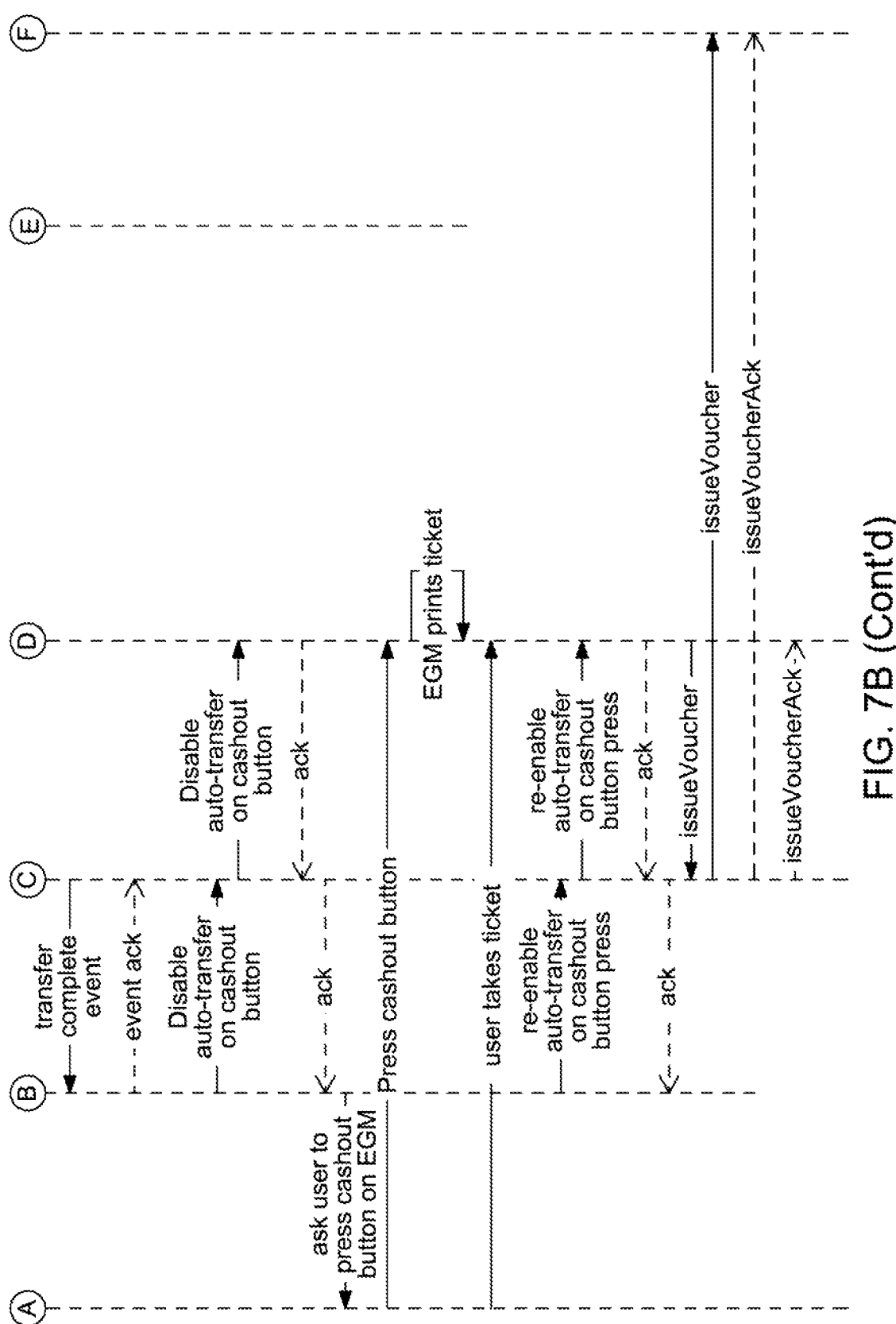

Following the user requesting an available amount of funds to be converted to a ticket voucher via one or more user interfaces, as seen in FIG. 7B (which illustrates the described interactions between the user, an externally controlled service window displayed by an EGM, a SMIB associated with the EGM, the EGM, a component of a gaming establishment fund management system (i.e., the cashless system), and a component of a gaming establishment ticket voucher management system (i.e., the casino ticket system)), the system attempts to transfer the requested amount of funds to be converted to a ticket voucher from one or more gaming establishment accounts to the credit meter of the EGM.

More specifically, in certain embodiments, one or more components of the gaming establishment fund management system operate to cause the credit meter of the EGM to at least equal the requested amount of funds to be converted to a ticket voucher. In these embodiments, the system requests a transfer of the amount of funds from one or more gaming establishment accounts and the component of the gaming establishment fund management system determines whether or not to approve the transfer of the requested amount of funds. In such embodiments, upon the user's request of the issuance of a ticket voucher for an amount of funds held in one or more gaming establishment accounts, the gaming establishment fund management system logs the user into a gaming establishment account associated with the user (if necessary) and determines whether to authorize a transfer of an amount of funds needed to complete the requested transaction. In these embodiments, a component of the gaming establishment fund management system (e.g., one or more servers that maintain one or more gaming establishment accounts associated with the user) determines whether the amount of funds currently maintained in association with the gaming establishment account is at least equal to the requested amount of funds.

If the component of the gaming establishment fund management system is unable to approve the amount requested based on the amounts held in one or more gaming establishment accounts associated with the user and/or one or more applicable limits, the system notifies the user, via the applicable user interface and/or one or more messages, of the unavailability of issuing a ticket voucher with the amount of funds requested. For example, if one or more limits are associated with the gaming establishment account, the component of the gaming establishment fund management system declines the transaction (even if the amount of funds in the gaming establishment would otherwise cover the amount of funds of the requested ticket voucher). On the other hand, if the component of the gaming establishment fund management system approves the amount requested from one or more gaming establishment accounts associated with the user, the system transfers the amount requested to the credit meter of the EGM. Following such a transfer, the credit meter of the EGM contains at least the amount of funds requested to be converted to a ticket voucher. For example, as seen in FIG. 7B, the system determines that since $75.25 is requested to be cashed out to a ticket voucher and since the cashless balance of $510 is greater than the $75.25 requested, the $75.25 is approved to be transferred from the cashless wagering account to the credit meter of the EGM to enable the EGM to issue a ticket voucher associated with an amount of $75.25.

Following the transfer of funds to the credit meter of the EGM, to enable a conversion of the credit meter of the EGM to the ticket voucher, as described above, the system disables the feature of the EGM that causes any cashed out amounts from the credit meter of the EGM to be automatically transferred to an applicable gaming establishment account. It should be appreciated that in this embodiment, while the amount of funds of the credit meter of the EGM are transferred to the gaming establishment account when the user initially engages the cashout button (to initiate the potential ticket voucher creation sequence), since the amount of funds to be converted to the ticket voucher are subsequently transferred to the credit meter of the EGM, a subsequent engagement of the cashout button needs to occur as part of this ticket voucher creation sequence. As such, to facilitate the cashout to ticket voucher feature of the present disclosure, the system of certain embodiments temporarily disables the automatic transfer on cashout feature to enable the credit meter of the EGM (which includes funds transferred from a gaming establishment account) to be converted to a ticket voucher. Accordingly, to avoid the amount of the credit meter of the EGM to be transferred back to the gaming establishment account (and thus to eliminate the wasted computational resources and unnecessary bandwidth usage associated therewith), the system disables this automatic transfer on cashout feature such that the credit meter of the EGM will not be automatically transferred to the gaming establishment account when a cashout transactions occurs in association with the creation of a ticket voucher.

In certain embodiments, after disabling the automatic transfer on cashout feature, the system notifies the user to initiate a cashout transaction (e.g., press a cashout button) to obtain the ticket voucher associated with the requested amount. Following the user initiating the cashout transaction to obtain the ticket voucher, the system updates the credit meter of the EGM to reflect the exchange of an amount of funds for a ticket voucher and creates a ticket voucher for that amount of funds. For example, as seen in FIG. 6, following the user pressing the cashout button of the EGM, the EGM reduces the credit meter of the EGM from $75.25 to $0.00 to reflect the issuance of the ticket voucher associated with $75.25. More specifically, when the cashout button is pressed following the disablement of the automatic transfer on cashout feature, the EGM operates with the component of the ticket voucher management system to cause a ticket voucher associated with the amount of the credit meter of the EGM to be issued to the user and cause a transfer of the amount of funds associated with the ticket voucher to an account associated with the gaming establishment ticket voucher management system. In such embodiments, the ticket voucher management system stores data associated with the issued ticket voucher to enable a subsequent redemption of the ticket voucher at a supported redemption touchpoint, such as at an EGM, a kiosk and/or a gaming establishment interface.

In certain embodiments, following the issuance of the ticket voucher, the system enables the feature of the EGM that causes any cashed out amounts from the credit meter of the EGM to be automatically transferred to an applicable gaming establishment account. In these embodiments, to again comply with certain EGM-to-host protocols, the system modifies the operation of the EGM to enable an automatic transfer on cashout feature such that the EGM again expects the host, such as a component of a gaming establishment fund management system, to automatically take the funds from the EGM's credit meter when the cashout button of the EGM is pressed. Accordingly, in certain embodiments, the system of the present disclosure enables an amount of funds from a gaming establishment account associated with a user to be transferred to a credit meter of an EGM and then cashed out to a ticket voucher temporarily bypassing any automatic transfers of funds back to the gaming establishment account.

It should be appreciated that while FIGS. 6, 7A and 7B illustrate a transfer of funds from an account of a cashless wagering system to the EGM, depending upon the amount selected by the user and the amount in different accounts associated with the user, additional transfers and/or messages may be required. In one such embodiment, dependent on the amount of funds in one or more gaming establishment accounts, transfers from multiple gaming establishment accounts associated with the user may be required to cause the credit meter of the EGM to at least equal the amount of the requested ticket voucher. In another such embodiments, dependent on the amount of funds in one or more gaming establishment accounts, a portion of the amount of funds of the credit meter is transferred to one or more of gaming establishment accounts as part of the overall transaction.

It should be further appreciated that while FIGS. 6, 7A and 7B illustrate certain components orchestrating part or all of the overall transaction via inputs received by the externally controlled service window displayed by the EGM, in different embodiments, one or more other components operate to determine the amount to be transferred to and/or from one or more gaming establishment accounts as well as enable and disable the automatic transfer on cashout feature. For example, a mobile device application being executed by a mobile device requests another component, such as the SMIB, to coordinate part or all of the overall transaction with components of the gaming establishment fund management system, the gaming establishment ticket voucher management system and/or the gaming establishment credit system. In this example, if the SMIB is coordinating the transaction, the SMIB receives a message from the mobile device application that specifies the amount the user wants to cashout to a ticket voucher, and then the SMIB determines the amounts to transfer to and/or from one or more gaming establishment accounts as well as to enable and disable the automatic transfer on cashout feature when required.

In certain embodiments, prior to enabling an identified user to make a request of an amount of funds from a gaming establishment account to be issued as a ticket voucher, the system requires the user to enter a personal identification number ("PIN") and/or present a biometric identifier to access the user interface to select an amount to be potentially converted to a ticket voucher. In certain other embodiments, after an identified user has selected an amount to be potentially converted to a ticket voucher but prior to enabling the user to confirm the selections, the system requires the user to enter a PIN and/or present a biometric identifier. In certain embodiments, the system requires the user to enter a PIN and/or present a biometric identifier in association with each transaction that accesses funds in one or more gaming establishment accounts associated with the user. In certain other embodiments, if the user previously entered a PIN and/or presented a biometric identifier in association with a current session, the system does not require the user to reenter the PIN and/or represent the biometric identifier in association with each transaction of the current session.

In another embodiment, prior to completing the conversion of an amount of funds associated with the user to a ticket voucher, the system communicates a notification to a mobile device application and requests the user to confirm the transaction via the mobile device application. In another embodiment, prior to completing the conversion of an amount of funds associated with the user to a ticket voucher, the system communicates a short message service ("SMS") or text message to a mobile phone number associated with the user's account and requests the user to confirm the transaction via replying with a "yes" or other equivalent response. In another embodiment, prior to completing the conversion of an amount of funds associated with the user to a ticket voucher, the system communicates, via SMS, text and/or a mobile device notification, a random code, such as a four digit code, and requests the user to confirm the transaction via inputting the random code using another user interface, such as a using an externally controlled service window displayed by the EGM.

It should be appreciated that since, in certain embodiments, a created ticket voucher may take multiple forms, the system includes multiple ways to convey such a created ticket voucher to the user. In one embodiment wherein the created ticket voucher takes the form of a paper ticket voucher, the ticket voucher system causes a ticket voucher printer to print the created ticket voucher. In another embodiment wherein the created ticket voucher takes the form of a virtual ticket voucher, the ticket voucher system communicates data to a device associated with the user, such as a mobile device running an application associated with the ticket voucher system, to transfer the created virtual ticket voucher to the user.

In certain embodiments, in association with a ticket voucher system issuing a ticket voucher, the ticket voucher system stores a record of the ticket voucher. Such a record of the ticket voucher includes, for each ticket voucher, ticket voucher identification information including, but not limited to, one or more of: (i) a gaming establishment name; (ii) a gaming establishment address; (iii) a ticket voucher title (e.g., "cashout ticket" or "cashout voucher"); (iv) a ticket voucher validation number (e.g., an eighteen digit number or code of the issued ticket voucher printed on the ticket voucher); (v) a ticket voucher validation number bar code (i.e., a bar code that contains an encoded ticket voucher validation number; (vi) a ticket date/time (i.e., a date/time when the ticket voucher was issued); (vii) a ticket number (i.e., a sequential number printed on the ticket voucher by an EGM); (viii) an amount (i.e., an amount of the ticket voucher as a numerical value with a currency sign); (ix) an amount in words (i.e., the amount of the issued ticket voucher in words); (x) an expiration (i.e., an expiration date of the ticket voucher (if the ticket is a promotion or non-cashable ticket)); (xi) a machine identification (i.e., an asset or machine number of the device, such as an EGM or a kiosk, that printed the ticket voucher); (xii) font or format-ting information associated with the ticket voucher, and/or (xiii) an image of the ticket voucher (e.g., an image of a front of the ticket voucher and/or an image of a back of the ticket voucher).

In certain embodiments, the system employs certain anti-money laundering controls or limits to the ability of a user to convert funds in one or more gaming establishment accounts to a ticket voucher. In one such embodiment, the system implements limits on a per user basis to support financial transaction rules in a particular jurisdiction. For example, a user may be limited to printing less than $2000 in tickets per day in the United States to stay under FinCEN anti-money laundering rules. In other embodiments, the system does not employ hard limits on ticket voucher conversion activity. Rather, in these embodiments, the sys-tem monitors ticket voucher conversion activity and creates alerts based upon user activity. For example, based on an amount of ticket voucher conversion activity undertaken by a user, the system generates (or aids an operator in gener-ating) a Suspicious Activity Report (SAR) or Currency Transaction Report (CTR) that may have to be filed with the U.S. Government's FinCEN agency (either automatically by the system, or manually by gaming establishment personnel after review).

Accordingly, in certain embodiments, to enable a user to access funds in a gaming establishment account, such as a cashless wagering account, the system of the present dis-closure utilizes a procurement of a ticket voucher. As such, rather than a user having to travel to a gaming establishment service desk and engage with gaming establishment person-nel to withdraw funds held in a gaming establishment account (which requires time and effort of all parties involved and fosters the spread of diseases in such interac-tions), in certain embodiments, the system enables a user to obtain a ticket voucher associated with such funds and without having to interact with any gaming establishment personnel. In these embodiments, the system enables a user to make one or more inputs that result in an occurrence of a ticket voucher acquisition event. In certain embodiments, in association with the occurrence of the ticket voucher acquisition event, the system causes a transfer of an amount of funds from a gaming establishment account maintained for a user to a credit meter of an EGM and then to a component of a gaming establishment ticket management system in exchange for a ticket voucher. In certain other embodiments, in association with the occurrence of the ticket voucher acquisition event, the system causes a transfer of an amount of funds from a gaming establishment account maintained for a user to a component of a gaming estab-lishment ticket management system in exchange for a ticket voucher. In these different embodiments, following the transfer of funds to obtain a ticket voucher, the gaming establishment ticket management system causes the issu-ance of a ticket voucher associated with the requested amount of funds.

Accordingly, the system of the present disclosure supports the movement of funds from a gaming establishment account, such as a cashless wagering account, to a ticket voucher issued by an EGM and thus overcomes certain security concerns (e.g., users and/or gaming establishment personnel carrying large sums of cash) associated with cash-based gaming and provides for a relatively more effi-cient experience for users by reducing the quantity of touchpoints a user interacts with to obtain funds held in a gaming establishment account. In addition to providing a relatively safer environment via the reduction of uses of cash, the system of the present disclosure reduces face-to-face interactions between users and gaming establishment personnel, thereby reducing risks associated with the spread of diseases between such parties.

In various embodiments, prior to using funds in a gaming establishment account, such as using funds in a gaming establishment account to obtain a ticket voucher, the system enables the gaming establishment account to be funded from one or more sources. In certain embodiments, the system enables the gaming establishment account to be directly funded from one or more of such sources. In certain embodi-ments, the system enables the gaming establishment account to be indirectly funded from one or more of such sources, such as by an amount of funds from such sources first being transferred to another gaming establishment account and then such an amount of funds being transferred from the other gaming establishment account to the gaming estab-lishment account in association with the procurement of a ticket voucher. In certain embodiments, the system enables the gaming establishment account to be indirectly funded from one or more of external sources, such as by an amount of funds from such external sources first being transferred to the gaming establishment account in association with the procurement of a ticket voucher.

In certain embodiments, the gaming establishment account is associated with one or more external accounts, such as one or more credit card accounts, one or more debit card accounts and/or one or more third-party maintained accounts (e.g., one or more PayPal® accounts or Venmo® accounts). In certain embodiments, the gaming establish-ment account is associated with a gaming establishment or a group of gaming establishments, wherein the user estab-lishes a gaming establishment account by a deposit of funds (such as at a kiosk) to be subsequently utilized in association with the mobile device application. In other embodiments, the gaming establishment account is funded via a mobile device electronic fund transfer, such using Apple Pay™ or Android Pay™. It should be appreciated that in different embodiments, the system utilizes a mobile device running a mobile device application, a kiosk, an EGM, a gaming table component, a service window displayed by a gaming device (e.g., a remote host controlled service window displayed by an EGM) and/or a gaming establishment interface to facili-tate the transfer of funds from a third-party account. In certain embodiments, the system enables funds to be depos-ited in a gaming establishment account via activating a line of credit associated with the user.

In certain embodiments, the system enables funds to be deposited in a gaming establishment account, via a gaming device, such as an EGM and/or via a non-gaming device, such as a kiosk. In certain embodiments, the system enables a user that has an amount of cash to utilize a gaming device and/or a non-gaming device to convert the cash to an amount deposited into a gaming establishment account (which may be subsequently transferred utilizing a mobile device application). In other embodiments, the system enables funds to be deposited in a gaming establishment account via a gaming device and/or a non-gaming device that accepts printed ticket vouchers. In these embodiments, the system enables a user that has one or more printed ticket vouchers to utilize a gaming device and/or a non-gaming device to convert the printed ticket voucher to an amount deposited into a gaming establishment account (which may be subsequently transferred utilizing a mobile device application).

In certain embodiments, the system enables funds to be deposited in a gaming establishment account via a gaming establishment interface, such as a gaming establishment cage or desk. In certain embodiments, the system enables a user that has an amount of cash to utilize a gaming establishment interface, such as a gaming establishment cage or desk to convert the cash to an amount deposited into a gaming establishment account (which may be subsequently transferred utilizing a mobile device application). In other embodiments, the system enables funds to be deposited in a gaming establishment account via a gaming establishment interface that accepts printed ticket vouchers. In these embodiments, the system enables a user that has one or more printed ticket vouchers to utilize a gaming establishment interface to convert the printed ticket voucher to an amount deposited into a gaming establishment account (which may be subsequently transferred utilizing a mobile device application).

In certain embodiments, the gaming establishment account is associated with funds associated with one or more virtual ticket vouchers. In certain embodiments, the system enables a user associated with an amount of virtual ticket vouchers to utilize a gaming device (e.g., an EGM, or a component of an EGM), a non-gaming device (e.g., a kiosk), a mobile device running a mobile device application, and/or a gaming establishment interface to convert the virtual ticket vouchers to an amount deposited into a gaming establishment account.

It should be appreciated that the electronic fund data transfers of the present disclosure may occur in addition to or as an alternative from cash-based fund transfers and/or ticket voucher-based fund transfers. In one such embodiment, an amount of funds available to be converted to a ticket voucher is funded via any of an electronic fund transfer, a cash-based fund transfer or a ticket voucher-based fund transfer. In another embodiment, an amount of funds available to be converted to a ticket voucher is funded via an electronic fund transfer or a cash-based fund transfer (but is not funded via any ticket voucher-based fund transfer). In another embodiment, an amount of funds available to be converted to a ticket voucher is funded via an electronic fund transfer or a ticket voucher-based fund transfer (but is not funded via any cash-based fund transfer). In another embodiment, an amount of funds available to be converted to a ticket voucher is funded via an electronic fund transfer (but is not funded via a cash-based fund transfer nor a ticket voucher-based fund transfer).

It should be further appreciated that any functionality or process of the present disclosure may be implemented via one or more servers (associated with or independent of any component of any system disclosed herein), a mobile device application, one or more gaming establishment devices (e.g., a gaming device such as an EGM or a non-gaming device such as a kiosk located within or otherwise associated with a gaming establishment), and/or one or more components of a gaming establishment system (such as a component of a gaming establishment management system supported by or otherwise located inside a gaming establishment device). Accordingly, while certain functions, features or processes are described herein as being performed by one or more servers (e.g., a server of a gaming establishment fund management system), such functions, features or processes may alternatively be performed by one or more gaming establishment devices, one or more components of a gaming establishment system, one or more mobile device applications, or one or more gaming establishment components.

In certain embodiments, the above-described embodiments of the present disclosure may be implemented in accordance with or in conjunction with zero, one or more components of a gaming establishment fund management system (e.g., a cashless wagering system or a gaming establishment retail system); one or more components of a gaming establishment patron management system; zero, one or more components of a gaming establishment ticket management system; and/or zero, one or more gaming establishment devices. In these embodiments, such components of the gaming establishment fund management system, the gaming establishment patron management system, the gaming establishment ticket management system and/or the gaming establishment device each include a controller including at least one processor.

The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the gaming establishment fund management system, the component of the gaming establishment ticket management system, the component of the gaming establishment credit system, and/or the gaming establishment device; (3) accessing memory to configure or reconfigure parameters in the memory according to indicia read from the component of the gaming establishment fund management system, the component of the gaming establishment ticket management system, the component of the gaming establishment credit system, and/or the gaming establishment device; (4) communicating with interfaces and the peripheral devices (such as input/output devices); and/or (5) controlling the peripheral devices. In certain embodiments, one or more components of the controller (such as the at least one processor) reside within a housing of the component of the gaming establishment fund management system, the component of the gaming establishment ticket management system, the component of the gaming establishment credit system, and/or the gaming establishment device, while in other embodiments, at least one component of the controller resides outside of the housing of the component of the gaming establishment fund management system, the component of the gaming establishment ticket management system, the component of the gaming establishment credit system, and/or the gaming establishment device.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMS, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the gaming establishment fund management system, the component of the gaming establishment ticket management system, the component of the gaming establishment credit system, and/or the gaming establishment device disclosed herein. In certain embodiments, the at least one memory device resides within the housing of the component of the gaming establishment fund management system, the component of the gaming establishment ticket management system, the component of the gaming establishment credit system, and/or the gaming establishment device, while in other embodiments at least one component of the at least one memory device resides outside of the housing of the component of the gaming establishment fund management system, the component of the gaming establishment ticket management system, the component of the gaming establishment credit system, and/or the gaming establishment device. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the gaming establishment fund management system, the component of the gaming establishment ticket management system, the component of the gaming establishment credit system, and/or the gaming establishment device; (2) associations between configuration indicia read from the component of the gaming establishment fund management system, the component of the gaming establishment ticket management system, the component of the gaming establishment credit system, and/or the gaming establishment device with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the gaming establishment fund management system, the component of the gaming establishment ticket management system, the component of the gaming establishment credit system, and/or the gaming establishment device to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the gaming establishment fund management system, the component of the gaming establishment ticket management system, the component of the gaming establishment credit system, and/or the gaming establishment device to control the component of the gaming establishment fund management system, the component of the gaming establishment ticket management system, the component of the gaming establishment credit system, and/or the gaming establishment device. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in a component of the gaming establishment fund management system to implement at least part of the present disclosure. In other embodiments, part or all of the program code and/or the operating data is downloaded to the at least one memory device of the component of the gaming establishment fund management system, the component of the gaming establishment ticket management system, the component of the gaming establishment credit system, and/or the gaming establishment device through any suitable data network described above (such as an Internet or intranet).

The at least one memory device also stores a plurality of device drivers. Examples of different types of device drivers include device drivers for the component of the gaming establishment fund management system, the component of the gaming establishment ticket management system, the component of the gaming establishment credit system, and/or the gaming establishment device and device drivers for the peripheral components. Typically, the device drivers utilize various communication protocols that enable communication with a particular physical device. The device driver abstracts the hardware implementation of that device.

For example, a device driver may be written for each type of card reader that could potentially be connected to the component of the gaming establishment fund management system, the component of the gaming establishment ticket management system, the component of the gaming establishment credit system, and/or the gaming establishment device. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the component of the gaming establishment fund management system, the component of the gaming establishment ticket management system, the component of the gaming establishment credit system, and/or the gaming establishment device loads the new device driver from the at least one memory device to enable communication with the new device. For instance, one type of card reader in the component of the gaming establishment fund management system, the component of the gaming establishment ticket management system, the component of the gaming establishment credit system, and/or the gaming establishment device can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified components of the component of the gaming establishment fund management system, the component of the gaming establishment ticket management system, the component of the gaming establishment credit system, and/or the gaming establishment device and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

The at least one output device includes at least one display device configured to display any suitable information. In certain embodiments, the display devices are connected to or mounted on a housing of the component of the gaming establishment fund management system, the component of the gaming establishment ticket management system, the component of the gaming establishment credit system, and/ or the gaming establishment device. In various embodiments, the display devices serve as digital glass configured to aspects of the gaming establishment in which the component of the gaming establishment fund management system, the component of the gaming establishment ticket management system, the component of the gaming establishment credit system, and/or the gaming establishment device is located. In various embodiments, the component of the gaming establishment fund management system, the component of the gaming establishment ticket management system, the component of the gaming establishment credit system, and/or the gaming establishment device includes zero, one or more of the following display devices: (a) a central display device; (b) a player tracking display configured to display various information regarding a user's player tracking status; (c) a secondary or upper display device in addition to the central display device and the player tracking display; (d) a credit display configured to display a current quantity of credits, amount of cash, account balance, or the equivalent; and (e) a bet display. In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

In various embodiments, the at least one output device includes a payout device. In these embodiments, after the component of the gaming establishment fund management system, the component of the gaming establishment ticket management system, the component of the gaming establishment credit system, and/or the gaming establishment device receives an actuation, the component of the gaming establishment fund management system, the component of the gaming establishment ticket management system, the component of the gaming establishment credit system, and/ or the gaming establishment device causes the payout device to provide a payment to the user. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. In certain embodiments, rather than dispensing bills, coins, or a physical ticket having a monetary value to the user following receipt of an actuation of the cashout device, the payout device is configured to cause a payment to be provided to the user in the form of an electronic funds transfer, such as via a direct deposit into a bank account, a casino account, or a prepaid account of the user; via a transfer of funds onto an electronically recordable identification card or smart card of the user; or via sending a virtual ticket having a monetary value to an electronic device of the user.

In certain embodiments, the at least one output device is a sound generating device controlled by one or more sound cards. In one such embodiment, the sound generating device includes one or more speakers or other sound generating hardware and/or software configured to generate sounds, such as by playing music. In another such embodiment, the component of the gaming establishment fund management system, the component of the gaming establishment ticket management system, the component of the gaming establishment credit system, and/or the gaming establishment device provides dynamic sounds coupled with attractive multimedia images displayed on one or more of the display devices to provide an audio-visual representation or to otherwise display full-motion video with sound to attract users to the component of the gaming establishment fund management system, the component of the gaming establishment ticket management system, the component of the gaming establishment credit system, and/or the gaming establishment device. In certain embodiments, the component of the gaming establishment fund management system, the component of the gaming establishment ticket management system, the component of the gaming establishment credit system, and/or the gaming establishment device displays a sequence of audio and/or visual attraction messages during idle periods to attract potential users to the component of the gaming establishment fund management system, the component of the gaming establishment ticket management system, the component of the gaming establishment credit system, and/or the gaming establishment device. The videos may be customized to provide any appropriate information.

The at least one input device may include any suitable device that enables an input signal to be produced and received by the at least one processor of the component of the gaming establishment fund management system, the component of the gaming establishment ticket management system, the component of the gaming establishment credit system, and/or the gaming establishment device. In one embodiment, the at least one input device includes a payment device configured to communicate with the at least one processor of the component of the gaming establishment fund management system, the component of the gaming establishment ticket management system, the component of the gaming establishment credit system, and/or the gaming establishment device to fund the component of the gaming establishment fund management system, the component of the gaming establishment ticket management system, the component of the gaming establishment credit system, and/ or the gaming establishment device. In certain embodiments, the payment device includes zero, one or more of: (a) a bill acceptor into which paper money is inserted; (b) a ticket acceptor into which a ticket or a voucher is inserted; (c) a reader or a validator for credit cards, debit cards, or credit slips into which a credit card, debit card, or credit slip is inserted; (d) a player identification card reader into which a player identification card is inserted; or (e) any suitable combination thereof. In one embodiment, the at least one input device includes a payment device configured to enable the component of the gaming establishment fund management system, the component of the gaming establishment ticket management system, the component of the gaming establishment credit system, and/or the gaming establishment device to be funded via an electronic funds transfer, such as a transfer of funds from a bank account. In another embodiment, the component of the gaming establishment fund management system, the component of the gaming establishment ticket management system, the component of the gaming establishment credit system, and/or the gaming establishment device includes a payment device configured to communicate with a mobile device of a user, such as a mobile phone, a radio frequency identification tag, or any other suitable wired or wireless device, to retrieve relevant information associated with that user to fund the component of the gaming establishment fund management system, the component of the gaming establishment ticket management system, the component of the gaming establishment credit system, and/or the gaming establishment device. When the component of the gaming establishment fund management system, the component of the gaming establishment ticket management system, the component of the gaming establishment credit system, and/or the gaming establishment device is funded, the at least one processor determines the amount of funds entered and displays the corresponding amount.

In various embodiments, the at least one input device includes a plurality of buttons that are programmable by the component of the gaming establishment fund management system, the component of the gaming establishment ticket management system, the component of the gaming establishment credit system, and/or the gaming establishment device operator to, when actuated, cause the component of the gaming establishment fund management system, the component of the gaming establishment ticket management system, the component of the gaming establishment credit system, and/or the gaming establishment device to perform particular functions. For instance, such buttons may be hard keys, programmable soft keys, or icons icon displayed on a display device of the component of the gaming establishment fund management system, the component of the gaming establishment ticket management system, the component of the gaming establishment credit system, and/or the gaming establishment device that are actuatable via a touch screen of the component of the gaming establishment fund management system, the component of the gaming establishment ticket management system, the component of the gaming establishment credit system, and/or the gaming establishment device or via use of a suitable input device of the component of the gaming establishment fund management system, the component of the gaming establishment ticket management system, the component of the gaming establishment credit system, and/or the gaming establishment device. In certain embodiments, the at least one input device includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the component of the gaming establishment fund management system, the component of the gaming establishment ticket management system, the component of the gaming establishment credit system, and/or the gaming establishment device by touching the touch screen at the appropriate locations.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more user input devices near the component of the gaming establishment fund management system, the component of the gaming establishment ticket management system, the component of the gaming establishment credit system, and/or the gaming establishment device. In one embodiment, a user input device docking region is provided, and includes a power distribution component that is configured to recharge a user input device without requiring metal-to-metal contact. In one embodiment, the at least one power distribution component is configured to distribute power to one or more internal components of the component of the gaming establishment fund management system, the component of the gaming establishment ticket management system, the component of the gaming establishment credit system, and/or the gaming establishment device, such as one or more rechargeable power sources (e.g., rechargeable batteries) located at the component of the gaming establishment fund management system, the component of the gaming establishment ticket management system, the component of the gaming establishment credit system, and/or the gaming establishment device.

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity to the component of the gaming establishment fund management system, the component of the gaming establishment ticket management system, the component of the gaming establishment credit system, and/or the gaming establishment device; detecting the presence and/or identity of various persons (e.g., users, casino employees, etc.), devices (e.g., user input devices), and/or systems within a predetermined proximity to the component of the gaming establishment fund management system, the component of the gaming establishment ticket management system, the component of the gaming establishment credit system, and/or the gaming establishment device.

The at least one data preservation component is configured to detect or sense one or more events and/or conditions that, for example, may result in damage to the component of the gaming establishment fund management system, the component of the gaming establishment ticket management system, the component of the gaming establishment credit system, and/or the gaming establishment device and/or that may result in loss of information associated with the component of the gaming establishment fund management system, the component of the gaming establishment ticket management system, the component of the gaming establishment credit system, and/or the gaming establishment device. Additionally, the data preservation system may be operable to initiate one or more appropriate action(s) in response to the detection of such events/conditions.

The at least one motion/gesture analysis and interpretation component is configured to analyze and/or interpret information relating to detected user movements and/or gestures to determine appropriate user input information relating to the detected user movements and/or gestures. For example, in one embodiment, the at least one motion/gesture analysis and interpretation component is configured to perform one or more of the following functions: analyze the detected gross motion or gestures of a user; interpret the user's motion or gestures (e.g., in the context of a casino game being played) to identify instructions or input from the user; utilize the interpreted instructions/input to advance the game state; etc. In other embodiments, at least a portion of these additional functions may be implemented at a remote system or device.

The at least one portable power source enables the component of the gaming establishment fund management system, the component of the gaming establishment ticket management system, the component of the gaming establishment credit system, and/or the gaming establishment device to operate in a mobile environment.

The at least one geolocation module is configured to acquire geolocation information from one or more remote sources and use the acquired geolocation information to determine information relating to a relative and/or absolute position of the component of the gaming establishment fund management system, the component of the gaming establishment ticket management system, the component of the gaming establishment credit system, and/or the gaming establishment device. For example, in one implementation, the at least one geolocation module is configured to receive GPS signal information for use in determining the position or location of the component of the gaming establishment fund management system, the component of the gaming establishment ticket management system, the component of the gaming establishment credit system, and/or the gaming establishment device. In another implementation, the at least one geolocation module is configured to receive multiple wireless signals from multiple remote devices (e.g., component of the gaming establishment fund management system, the gaming establishment patron management system, and/or the gaming establishment devices, servers, wireless access points, etc.) and use the signal information to compute position/location information relating to the position or location of the component of the gaming establishment fund management system, the component of the gaming establishment ticket management system, the component of the gaming establishment credit system, and/or the gaming establishment device.

The at least one user identification module is configured to determine the identity of the current user or current owner of the component of the gaming establishment fund management system, the component of the gaming establishment ticket management system, the component of the gaming establishment credit system, and/or the gaming establishment device. For example, in one embodiment, the current user is required to perform a login process at the component of the gaming establishment fund management system, the component of the gaming establishment ticket management system, the component of the gaming establishment credit system, and/or the gaming establishment device in order to access one or more features. Alternatively, the component of the gaming establishment fund management system, the component of the gaming establishment ticket management system, the component of the gaming establishment credit system, and/or the gaming establishment device is configured to automatically determine the identity of the current user based on one or more external signals, such as an RFID tag or badge worn by the current user and that provides a wireless signal to the component of the gaming establishment fund management system, the component of the gaming establishment ticket management system, the component of the gaming establishment credit system, and/or the gaming establishment device that is used to determine the identity of the current user. In at least one embodiment, various security features are incorporated into the component of the gaming establishment fund management system, the component of the gaming establishment ticket management system, the component of the gaming establishment credit system, and/or the gaming establishment device to prevent unauthorized users from accessing confidential or sensitive information.

The at least one information filtering module is configured to perform filtering (e.g., based on specified criteria) of selected information to be displayed at one or more displays of the component of the gaming establishment fund management system, the component of the gaming establishment ticket management system, the component of the gaming establishment credit system, and/or the gaming establishment device.

In various embodiments, the component of the gaming establishment fund management system, the component of the gaming establishment ticket management system, the component of the gaming establishment credit system, and/or the gaming establishment device includes a plurality of communication ports configured to enable the at least one processor of the component of the gaming establishment fund management system, the component of the gaming establishment ticket management system, the component of the gaming establishment credit system, and/or the gaming establishment device to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, the component of the gaming establishment fund management system, the component of the gaming establishment ticket management system, the component of the gaming establishment credit system, and/or the gaming establishment device has a support structure, housing, or cabinet that provides support for a plurality of the input devices and the output devices of the component of the gaming establishment fund management system, the component of the gaming establishment ticket management system, the component of the gaming establishment credit system, and/or the gaming establishment device.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:
a processor; and
a memory device that stores a plurality of instructions that, when executed by the processor responsive to a first cashout input being received by an input device of an electronic gaming machine that causes an automatic transfer of a first amount of funds of a credit meter of the electronic gaming machine to a gaming establishment account associated with a user, cause the processor to:
communicate data that results in a display of a second amount of funds available, and
responsive to an input to obtain a ticket voucher associated with a third amount of funds and a transfer of the third amount of funds from the gaming establishment account associated with the user to the credit meter of the electronic gaming machine:
cause a first modification of the electronic gaming machine to disable an automatic transfer on cashout feature of the electronic gaming machine, and
following the electronic gaming machine issuing the ticket voucher associated with the third amount of funds responsive to a second cashout input being received by the input device of the electronic gaming machine when the automatic transfer on cashout feature of the electronic gaming machine is disabled, cause a second modification of the electronic gaming machine to enable the automatic transfer on cashout feature of the electronic gaming machine.

2. The system of claim 1, wherein the input to obtain a ticket voucher is received via one of an externally controlled service window displayed by a display device of the electronic gaming machine and a mobile device application being executed by a mobile device.

3. The system of claim 1, wherein the second amount of funds available is based on an amount of funds associated with the gaming establishment account.

4. The system of claim 1, wherein the second amount of funds available comprises an amount of funds associated with the gaming establishment account reduced by any amount of funds owed in association with an activated line of credit.

5. The system of claim 1, wherein the third amount of funds comprises the second amount of funds.

6. The system of claim 1, wherein the memory device stores a plurality of further instructions that, when executed by the processor, cause the processor to limit the second amount of funds available based on an anti-money laundering control.

7. The system of claim 1, wherein the ticket voucher comprises a virtual ticket voucher issued in association with a gaming establishment ticket management system.

8. The system of claim 1, wherein the processor comprises a processor of a slot machine interface board associated with the electronic gaming machine.

9. The system of claim 1, wherein data that results in at least one of the first modification of the electronic gaming machine and the second modification of the electronic gaming machine is communicated from a component that controls a service window displayed by a display device of the electronic gaming machine.

10. A system comprising:
a processor; and
a memory device that stores a plurality of instructions that, when executed by the processor, cause the processor to:
responsive to a first cashout input received by an input device of an electronic gaming machine, cause an automatic transfer of a first amount of funds of a credit meter of an electronic gaming machine to a gaming establishment account associated with a user,
responsive to an input to obtain a ticket voucher associated with a second amount of funds being received, cause the second amount of funds to be transferred from the gaming establishment account associated with the user to the credit meter of the electronic gaming machine, and
responsive to a second cashout input received by the input device of the electronic gaming machine, bypass any automatic transfer of the second amount of funds transferred to the credit meter of the electronic gaming machine back to the gaming establishment account associated with the user and cause an issuance of the ticket voucher associated with the second amount of funds.

11. The system of claim 10, wherein the transfer of the second amount of funds occurs following a settlement of any amount of funds owed in association with an activated line of credit.

12. A method of operating a system, the method comprising:
responsive to a first cashout input being received by an input device of an electronic gaming machine that causes an automatic transfer of a first amount of funds of a credit meter of the electronic gaming machine to a gaming establishment account associated with a user:

causing a display, by a display device, of a second amount of funds available, and responsive to an input to obtain a ticket voucher associated with a third amount of funds and a transfer of the third amount of funds from the gaming establishment account associated with the user to the credit meter of the electronic gaming machine:

causing, by a processor, a first modification of the electronic gaming machine to disable an automatic transfer on cashout feature of the electronic gaming machine, and following the electronic gaming machine issuing the ticket voucher associated with the third amount of funds responsive to a second cashout input being received by the input device of the electronic gaming machine when the automatic transfer on cashout feature of the electronic gaming machine is disabled, causing, by the processor, a second modification of the electronic gaming machine to enable the automatic transfer on cashout feature of the electronic gaming machine.

13. The method of claim 12, wherein the input to obtain the ticket voucher is received via one of an externally controlled service window displayed by a display device of the electronic gaming machine and a mobile device application being executed by a mobile device.

14. The method of claim 12, wherein the second amount of funds available is based on an amount of funds associated with the gaming establishment account.

15. The method of claim 12, wherein the second amount of funds available comprises an amount of funds associated with the gaming establishment account reduced by any amount of funds owed in association with an activated line of credit.

16. The method of claim 12, wherein the third amount of funds comprises the second amount of funds.

17. The method of claim 12, further comprising limiting the second amount of funds available based on an anti-money laundering control.

18. The method of claim 12, wherein the ticket voucher comprises a virtual ticket voucher issued in association with a gaming establishment ticket management system.

19. The method of claim 12, wherein the processor comprises a processor of a slot machine interface board associated with the electronic gaming machine.

20. The method of claim 12, wherein data that results in at least one of the first modification of the electronic gaming machine and the second modification of the electronic gaming machine is communicated from a component that controls a service window displayed by a display device of the electronic gaming machine.

* * * * *